(12) United States Patent
Park

(10) Patent No.: US 7,400,075 B2
(45) Date of Patent: Jul. 15, 2008

(54) ROTATING APPARATUS USING A MAGNET AND ROTATING DECORATION EMPLOYING THE SAME

(75) Inventor: Man-Suk Park, Seoul (KR)

(73) Assignee: Moon Kim, Bainbridge Island, WA (US)

( * ) Notice: Subject to any disclaimer, the term of this patent is extended or adjusted under 35 U.S.C. 154(b) by 445 days.

(21) Appl. No.: 11/251,064

(22) Filed: Oct. 14, 2005

(65) Prior Publication Data

US 2007/0085434 A1   Apr. 19, 2007

(51) Int. Cl.
*H02K 53/00* (2006.01)
*H02K 49/00* (2006.01)

(52) U.S. Cl. .................... 310/103; 310/152; 198/502.1; 417/420

(58) Field of Classification Search ............... 310/75 D, 310/75 R, 103–104, 112–115, 152, FOR. 100; 417/360, 420; 198/502.1, 780, 789, 805
See application file for complete search history.

(56) References Cited

U.S. PATENT DOCUMENTS

| | | | | |
|---|---|---|---|---|
| 3,411,450 A | * | 11/1968 | Clifton | 417/420 |
| 4,111,614 A | * | 9/1978 | Martin et al. | 417/420 |
| 4,163,164 A | * | 7/1979 | Pieters | 310/103 |
| 5,856,719 A | * | 1/1999 | De Armas | 310/103 |

FOREIGN PATENT DOCUMENTS

| | | | | |
|---|---|---|---|---|
| JP | 56047685 A | * | 4/1981 |
| JP | 05304787 A | * | 11/1993 |
| JP | 11069768 A | * | 3/1999 |
| JP | 11243681 A | * | 9/1999 |
| JP | 2000014121 A | * | 1/2000 |

* cited by examiner

*Primary Examiner*—Tran Nguyen
(74) *Attorney, Agent, or Firm*—Black Lowe & Graham PLLC

(57) ABSTRACT

A rotating apparatus includes a separating member, at least one movable magnet, and at least one passive magnet. The separating member is made of a nonmagnetic material, and interposed between the movable magnet and the passive magnet. The movable magnet is relatively shifted from the separating member along one surface of the separating member, and N-pole and S-pole of the movable magnet are arranged along the one surface of the separating member. The passive magnet is placed on the other surface of the separating member, and coupled with the movable magnet by magnetic force. When the movable magnet and the separating member are shifted relatively to each other, the passive magnet is shifted along the movable magnet and rotated on the other surface of the separating member.

43 Claims, 19 Drawing Sheets

ROTATING APPARATUS USING A MAGNET AND ROTATING DECORATION EMPLOYING THE SAME

PRIORITY CLAIM

This invention claims priority from published application WO/2004/093297 having the Patent Cooperation Treaty serial number PCT/KR2004/000613 and filed on Mar. 20, 2004, published on Oct. 28, 2004.

FIELD OF THE INVENTION

The present invention relates to a rotating apparatus using a magnet, and more particularly to a rotating apparatus using a magnet, which allows several passive magnets to be independently rotated using a single movable magnet, and a rotating decoration using the same.

BACKGROUND OF THE INVENTION

A conventional rotating apparatus using a magnet has a structure in which a passive magnet, coupled with a movable magnet by magnetic force, is rotated by the rotation of the movable magnet using a driving motor. The above-described rotating apparatus is mainly used in the case in which an output shaft of the driving motor cannot be directly connected to a driven object. For example, where an intermediate member is interposed between the output shaft of the driving motor and a rotary shaft of the rotating object, the output shaft of the motor cannot be directly connected to the rotary shaft of the rotating object using a power transmission device, such as a gear or a pulley. In such a case, the rotary force of the driving motor is transmitted to the passive magnet coupled with the movable magnet by the magnetic force by employing a rotating apparatus using a magnet, even though a nonmagnetic intermediate member, which does not affect the magnetic force, is interposed between the movable magnet and passive magnet.

Magnetic couplings such as described have been widely employed by, for example, stirring machines used in chemical laboratories, in toys, and in power transmission devices to drive machinery.

Such couplings are generally constructed such that one movable magnet connected to an output shaft of a driving motor is rotated and one passive magnet coupled to the movable magnet by magnetic force is rotated by the rotation of the movable magnet. The passive magnet is induced to rotate by the rotation of the movable magnet, in turn, driven by a motor. Accordingly, where an application requires that several passive magnets are rotated, a corresponding plurality movable magnets are required, and the plurality of movable magnets are connected to the driving motor by gears or pulleys.

The number of drive components, such as shafts, belts, gears or chains, for rotating the plural movable magnets increases in proportion to the number of the rotating objects desired. The increase of the number of drive components complicates the structure of the rotating apparatus, deteriorates assembling efficiency of the rotating apparatus, increases noise, and causes frequent defects in the rotating apparatus due to mechanical abrasion of the components. Further, the increase of the number of the above components increases loss of power due to rolling friction of the components, thereby lowering energy efficiency.

SUMMARY

The present invention has been made in view of the above problems and in one embodiment provides one movable magnet and a plurality of passive magnets coupled with the movable magnet by magnetic force are independently rotated so that a plurality of rotation bodies are rotated by the movable magnet, thereby reducing the number of components required by machinery.

The rotating apparatus includes a plurality of movable magnets which are not respectively rotated by motors, but the movable magnets and a separating member interposed between the movable magnets and the passive magnets are shifted relatively to each other, thereby inducing rotation of the plurality of passive magnets. Since the passive magnets are not directly connected to a driving shaft of the motor, it is possible to provide a power transmission device for independently transmitting rotary force to the rotation bodies. Further, the rotating apparatus constitutes machinery having a simple structure and has low production costs and high energy-efficiency.

The passive magnets are rotated and are simultaneously shifted. Here, the movable magnets are not directly rotated, but the movable magnets and a separating member interposed between the passive magnets and the movable magnets are shifted relatively to each other. Further, the passive magnets are shifted on the separating member along the movable magnets and simultaneously rotated. In case that the rotating apparatus of the present invention is used in a toy, an interior decoration, an advertising sign, etc., it is possible to have various visual effects such as a cubic effect and the feeling of movement.

A nonmagnetic separating member and at least one movable magnet relatively shifted from the separating member along one surface of the separating member, N-pole and S-pole of the movable magnet are arranged along the one surface of the separating member. At least one passive magnet is placed on the other surface of the separating member. The passive magnet couples with the movable magnet by magnetic force, and rotates on the other surface of the separating member while moving along the movable magnet when the movable magnet and the separating member are shifted relatively to each other.

The nonmagnetic separating member separates the at least two movable magnets offset from the separating member along one surface of the separating member, such that any one of N-pole and S-pole of each of the movable magnets is arranged along the one surface of the separating member; and at least one passive magnet placed on the other surface of the separating member, the passive magnet being coupled with the movable magnets by magnetic force, and rotating on the other surface of the separating member while moving along the movable magnets when the movable magnets and the separating member are shifted relatively to each other.

A nonmagnetic isolating member is placed on the other surface of the separating member at a position opposite to the movable magnet along the route formed by relative shift of the movable magnet and the separating member. The at least one passive magnet is placed beside the isolating member on the other surface of the separating member. The passive magnet becomes coupled with the movable magnet by magnetic force, and rotates on the other surface of the separating member while moving along the movable magnet when the movable magnet and the separating member are shifted relatively to each other.

The movable magnets and the passive magnets used in the rotating apparatus of the present invention may be preferably permanent magnets, and more preferably neodymium magnets consisting of neodymium, iron dioxide, and boron. The movable magnets and the passive magnets may have various shapes such as a circle, a square, a ring, etc. The separating member may be interposed between the movable magnets and the passive magnets to prevent the direct absorption of the movable magnets and the passive magnets. Further, the separating member may be made of a material not to be affected by magnetic force of the movable magnets and the passive magnets. Preferably, the separating member may be made of a nonmagnetic material such as aluminum stain, synthetic resin, and glass.

The rotation of the passive magnets of the rotating apparatus of the present invention is divided into two types, i.e., one type, in which shifting surfaces of the passive magnets on the separating member are parallel with rotating surfaces of the passive magnets (hereinafter, referred to as "horizontal rotation"), and the other type, in which the shifting surfaces of the passive magnets on the separating member are perpendicular to the rotating surfaces of the passive magnets (hereinafter, referred to as "rolling rotation"). In case that the passive magnets are horizontally rotated, the shapes of the passive magnets are not limited.

That is, in case that the passive magnets are horizontally rotated, the passive magnets may have square shapes. However, in case that the passive magnets are rollingly rotated, it is preferable that the passive magnets have cylindrical or disk shapes to have the circular cross-section thereof. In case that the passive magnets are installed in a separate rotation body, which can be rolling rotated, the passive magnets may have other shapes.

The movable magnets and separating member of the rotating apparatus of the present invention are shifted relatively to each other, thus being displaced against each other. That is, the movable magnets are fixed and the separating member is shifted, or the separating member is fixed and the movable magnets are shifted. The rotating apparatus of the present invention may further comprise driving means for shifting the movable magnets relatively to the separating member. The driving means is one selected from the group consisting of a conveyor device, a crank mechanism and a cam mechanism. Any one of the containing member and the separating member may be fixed to a driving shaft connected to the driving motor, thereby being rotated and shifted relatively to the other one of the containing member and the separating member.

Preferably, the rotating apparatus may further comprise a containing member, in case that a plurality of the movable magnets are shifted relatively to the separating member. The movable magnets are simultaneously shifted relatively to the separating member by shifting the containing member by means of the driving means. When the containing member is used, the containing member is arranged such that the containing member is shifted relatively to the separating member. The use of the containing member allows a plurality of the movable magnets to be arranged in a designated pattern, thereby allowing a plurality of the passive magnets to be arranged on the upper surface of the separating member in various patterns, and rotating or shifting the plural magnets simultaneously.

The above and other objects, features and other advantages of the present invention will be more clearly understood from the following detailed description taken in conjunction with the accompanying drawings.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

A preferred embodiment of the present invention will be described in detail with reference to the annexed drawings. First, the arrangement of components of a rotating apparatus using a magnet in accordance with the present invention will be described with reference to FIGS. 1A to 21B.

Figure 1A:
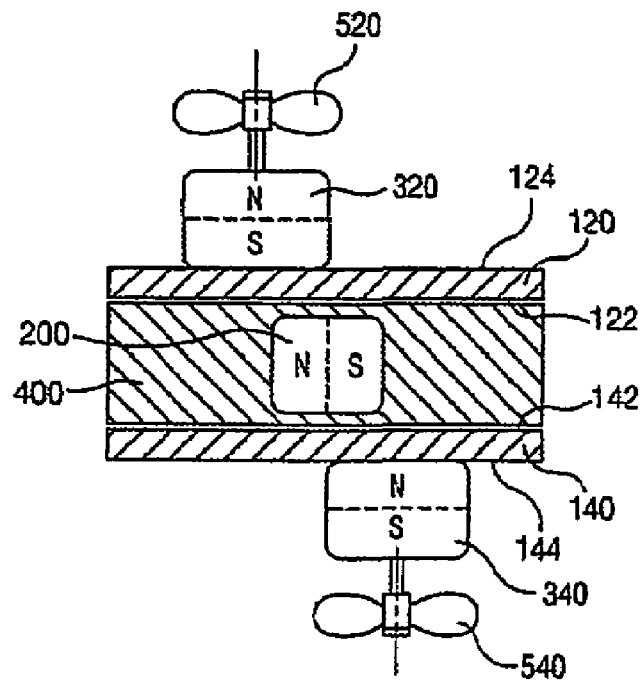
FIG. 1A is a cross-sectional view of a rotating apparatus using a magnet, illustrating arrangement of components, in which a passive magnet is horizontally rotated.

FIG. 1A is a cross-sectional view of a rotating apparatus using a magnet, illustrating arrangement of components, in which a passive magnet is horizontally rotated. As shown in FIG. 1a, a movable magnet 200 is positioned adjacent to lower surfaces 122 and 142 of separating members 120 and 140 having a flat plate shape. N-pole and S-pole of the movable magnet 200 is arranged along the lower surfaces 122 and 142 of the separating members 120 and 140. For example, in case that the movable magnet 200 includes two poles respectively formed on both surfaces thereof, the N-pole is positioned on the left and the S-pole is positioned on the right, or the S-pole is positioned on the left and the N-pole is positioned on the right. In case that the movable magnet 200 includes two poles formed on one surface thereof, a magnetic pole face, on which the N-pole and S-pole are formed, is positioned close to the lower surface of the separating member. That is, the N-pole and S-pole of the movable magnet 200 is positioned close to the lower surface of the separating member.

Passive magnets 320 and 340 are respectively positioned on upper surfaces 124 and 144 of the upper and lower separating members 120 and 140, in opposite to the lower surfaces 122 and 142. As shown in FIG. 1A, any one of the N-pole face and the S-pole face of each of the passive magnets 320 and 340 is situated on the upper surfaces 124 and 144 of the upper and lower separating members 120 and 140. The passive magnets 320 and 340 interact with the movable magnet 200 by magnetic force. Since attractive force is applied between the S-pole of the passive magnet 320 and the N-pole of the movable magnet 200, and repulsive force is applied between the S-pole of the passive magnet 320 and the S-pole of the movable magnet 200, the passive magnet 320 is arranges itself close to the N-pole of the movable magnet 200. In the same manner, since attractive force is applied between the N-pole of the passive magnet 340 and the S-pole of the movable magnet 200, and repulsive force is applied between the N-pole of the passive magnet 340 and the N-pole of the movable magnet 200, the passive magnet 340 arranges itself close to the S-pole of the movable magnet 200.

Next, the operation of the rotating apparatus having the arrangement of the magnets shown in FIG. 1A will be described with reference to FIG. 1B. Shown at the upside of the separating member 120, the passive magnet 320 is arranged close to one side of the movable magnet 200. In the above arrangement, when the separating member 120 moves toward an "A" direction, the passive magnet 320 is rotated in a "C" direction (i.e., clockwise direction). On the other hand, when the movable magnet 200 moves toward a "B" direction, the passive magnet 320 is shifted along the movable magnet 200 in the "B" direction and is simultaneously rotated in the "C" direction.

Since the magnetic attractive force generated from the movable magnet 200 is not uniformly distributed onto one surface of the passive magnet 320 situated on the separating member 120, the passive magnet 320 is rotated. That is, since the passive magnet 320 is arranged close to one side of the movable magnet 200, relatively strong magnetic attractive force of the movable magnet 200 is applied to a portion of the passive magnet 320 close to the movable magnet 200, and relatively weak magnetic attractive force of the movable magnet 200 is applied to other portion of the passive magnet 320 distant to the movable magnet 200.

Figure 1B:
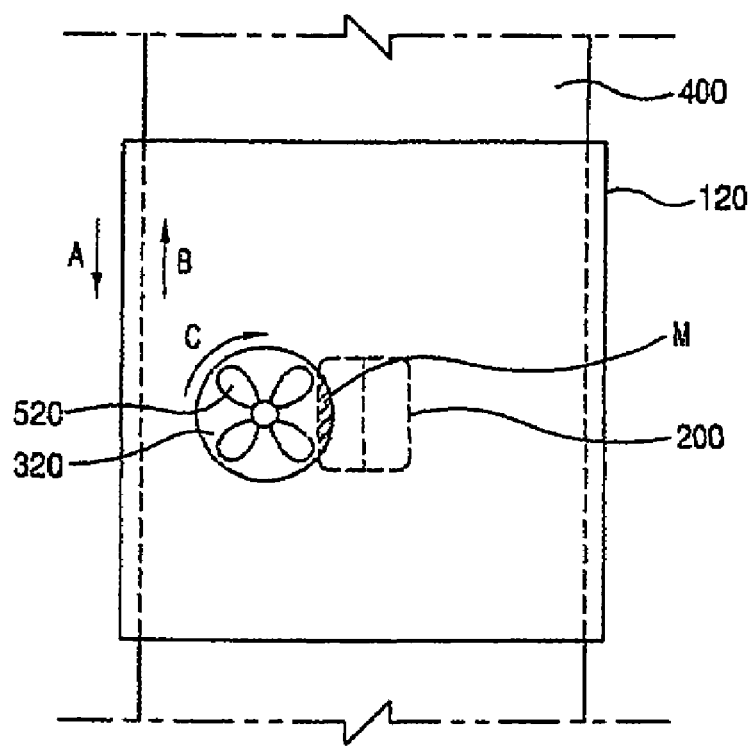
FIG. 1B is a top view of the rotating apparatus of FIG. 1a, illustrating the rotation and shift of the passive magnet positioned on an upper surface of a separating member.

With reference to FIG. 1B, a region 'M', is the vicinity in which the magnetic attractive force of the movable magnet 200 applied to the passive magnet 320 is at a maximum. The region 'M' is eccentric from the center of the passive magnet 320. As the movable magnet 200 and the separating member 120 are relatively shifted, the passive magnet 320 is shifted on the separating member 120. Here, frictional force is generated between the passive magnet 320 and the separating member 120. Since the frictional force is proportional to vertical resistance and the vertical resistance is proportional to magnetic attractive force applied between the movable magnet 200 and the passive magnet 320, the vertical resistance affecting the region 'M' of the passive magnet 320 is larger than that affecting other region of the passive magnet 320. Since the frictional force working on the region 'M' of the passive magnet 320 is larger than that working on other region of the passive magnet 320, rotation torque is generated onto the passive magnet 320. For the above reason, when the separating member 120 is shifted against the movable magnet 200, the passive magnet 320 arranged on the upper surface of the separating member 120 rotates without shifting its position relative to the movable magnet 200. On the other hand, when the movable magnet 200 is shifted against the separating member 120, the passive magnet 320 is rotated and simultaneously shifted along the movable magnet 200.

In the rotating apparatus, magnetic attractive force and repulsive force is simultaneously applied between the movable magnet 200 and the passive magnet 320. Accordingly, the passive magnet 320 is arranged at a position where the magnetic force applied between the passive magnet 320 and the movable magnet 200 is balanced. Particularly, the magnetic attractive force of the movable magnet 200 applied to the passive magnet 320 is biased toward one side of the passive magnet 320 in the region "M". For example, as shown in FIG. 1B, the magnetic attractive force applied to the region 'M' of the passive magnet 320 is stronger than that applied to other region of the passive magnet 320. The above-described arrangement of the passive magnet 320 and the movable magnet 200 induces the rotation of the passive magnet 320 upon movement of the separating member 120.

While as portrayed in FIG. 1A, the alignment of the N-pole and S-pole of the movable magnet is parallel with the lower surface of the separating member, such alignment is not necessary to achieve the movement of the passive magnet 320. That is, if the region 'M', where the magnetic attractive force of the movable magnet 200 applied to the passive magnet 320 is the maximum, can be set to be eccentric from a center of rotation of the passive magnet 320, the N-pole and S-pole of the movable magnet 200 can be inclined to the lower surface of the separating member at an angle less than 90 degrees.

In the rotating apparatus, as is shown in FIGS. 1A and 1B, the shorter the length of the movable magnet 200, the more distant from the center of rotation of the passive magnet the region "M", where the magnetic attractive force of the movable magnet is applied to the passive magnet is the maximum, is. Accordingly, the rotational torque generated from the passive magnet 320 according to the relative shift of the movable magnet 200 and the separating member 120 increases, thereby increasing the rotary force of the passive magnet 320.

A plurality of passive magnets 320, 340 may be arranged with a single movable magnet 200. As shown in FIG. 1A, the upper and lower separating members 120 and 140 are respectively arranged above and below a single movable magnet 200, thereby allowing a large number of passive magnets 320, 340 to be coupled with the movable magnet 200. That is, two passive magnets 320, 340 are arranged on each of the upper and lower separating members 120 and 140. Accordingly, it is possible to simultaneously rotate the four passive magnets using one movable magnet 200.

Further, it is possible to use a plurality of movable magnets. Advantageously, a containing member 400 can be configured to serve to fixedly arrange a plurality of movable magnets 200 and to shift the movable magnets 200 relative to the separating member 120. That is, the plural movable magnets 200 are separated from each other by a designated interval within the containing member 400, and the passive magnets 320, 340 are coupled with each of the movable magnets 200. Thereby, it is possible to simultaneously rotate the plural passive magnets 320, 340.

In the case that the movable magnet 200 is held within the containing member 400 as shown in FIG. 1A, the containing member 400 is partially interposed between the passive magnets 320 and 340 and the movable magnet 200.

Where the containing member 400 is, itself, made of a magnetic material, the affect is diminished by the magnetic interaction between the passive magnets 320 and 340 and the movable magnet 200. Accordingly, in case that the movable magnet 200 is contained within the containing member 400, it is preferable that the containing member 400 be made of a nonmagnetic material such as synthetic resin.

The separating member 120, 140 of the rotating apparatus is interposed between the movable magnet 200 and the passive magnets 320, 340 and prevents the passive magnet from coming directly into contact with the movable magnet 200. Further, the separating member 120 should be made of a material, which is not affected by the magnetic force of the movable magnet 200 and the passive magnets 320, 340. Preferably, the separating member 120 is made of a nonmagnetic material such as aluminum or other nonferrous metal, synthetic resin, glass, or other such nonmagnetic material.

Although the separating members 120 and 140 of FIGS. 1A and 1B have a flat plate shape, the shapes of the separating members 120 and 140 are not limited as long as the separating members 120 and 140 have surfaces along which the passive magnets 320 and 340 are shifted.

Where rotary members 520 and 540 are respectively attached to the passive magnets 320 and 340, the rotary members 520 and 540 are rotated according to the movement of the passive magnets 320 and 340, as the passive magnets 320 and 340 themselves rotate. Accordingly, it is possible to use the rotating apparatus using a magnet in accordance with the present invention as a rotating decoration having pleasing moving and visual effects.

Figure 2A:
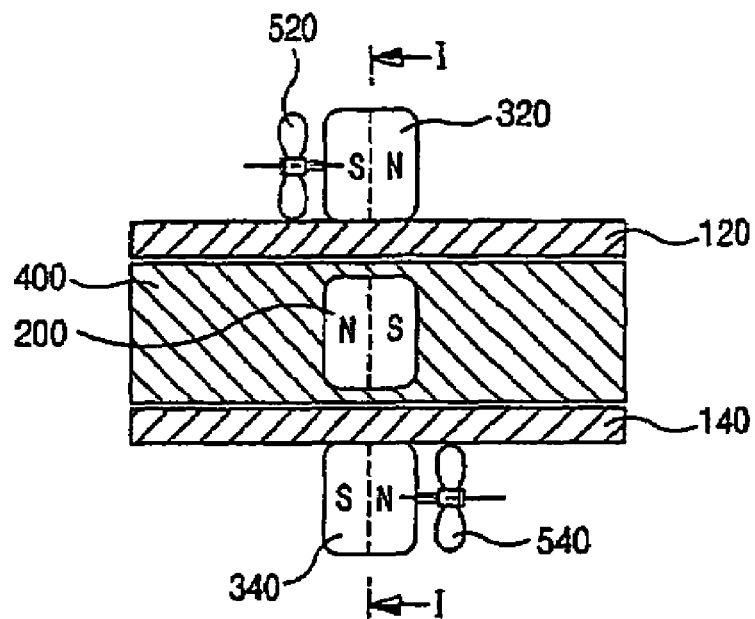
FIG. 2A is a cross-sectional view of a rotating apparatus using a magnet, illustrating arrangement of the components, in which the passive magnet is rollingly rotated.
Figure 2B:
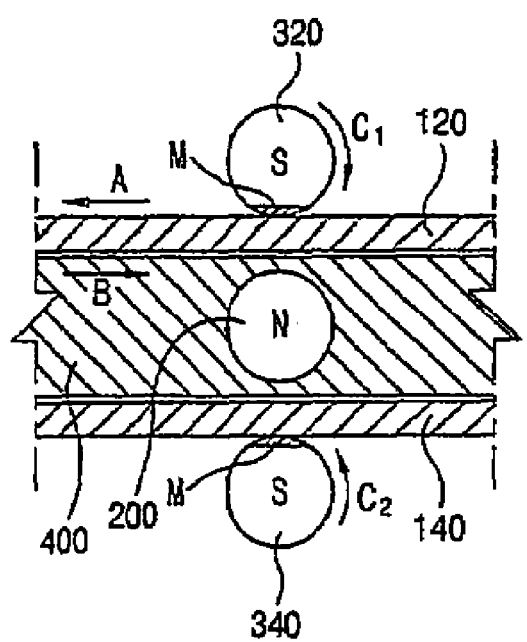
FIG. 2B is a cross-sectional view of the rotating apparatus of FIG. 2a taken along the line I-I.

The arrangement of a movable magnet, separating members and containing members of a rotating apparatus shown with reference to FIGS. 2A and 2B and is similar to that of the rotating apparatus shown in FIGS. 1A and 1B. However, while rotating surfaces of the passive magnets 320 and 340 are parallel with the separating members 120, 140 (that is, the passive magnets 320 and 340 are horizontally rotated) in FIGS. 1A and 1B, the rotating surfaces of passive magnets 320 and 340 are vertical to the separating members 120, 140 (that is, the passive magnets 320 and 340 are rollingly rotated rather that to rotate in a plane parallel to the separating members 120, 140) in FIGS. 2A and 2B. In case that the passive magnets 320 and 340 are rollingly rotated, it is preferable that cylindrical double-sided two-poles magnets are used as the passive magnets 320, 340 to facilitate the desired rolling motion.

With reference to FIGS. 1A and 2B, the arrangement of the passive magnets 320 and 340 and the movable magnet 200 will be described. Outer circumferences of the cylindrical passive magnets 320 and 340 are respectively situated on the upper and lower separating members 120 and 140. The S-poles of the passive magnets 320 and 340 correspond to the N-pole of the movable magnet 200, and the N-poles of the passive magnets 320 and 340 correspond to the S-pole of the movable magnet 200. As shown in FIG. 2B, when the separating members 120 and 140 are shifted toward an "A" direction, the passive magnets 320 and 340 are respectively rotated in the "$C_1$" and "$C_2$" directions without shifting relative to the movable magnet 200. On the other hand, when the movable magnet 200 is shifted against the separating members 120 and 140 toward a "B" direction, the passive magnets 320 and 340 are shifted along with the movable magnet 200 and are respectively rotated in the "$C_1$" and "$C_2$" directions.

In the rotating apparatus using a magnet shown in FIGS. 2A and 2B, the regions "M" (represented by the arcuate region defined by a chord) of the passive magnets 320 and 340, where the magnetic attractive force of the movable magnet 200 attracts strongly. The passive magnets 320 and 340 are situated on the upper surfaces of the upper and lower separating members 120 and 140 respectively. Accordingly, as the separating members 120 and 140 and the movable magnet 200 are relatively shifted, the passive magnets 320 and 340 are shifted on the upper surfaces of the separating members 120 and 140 along with the movement of the movable magnet 200. Here, too, frictional force is generated between the passive magnets 320 and 340 and the separating members 120 and 140 as the passive magnets 320 and 340 move translationally over the separating members 120 and 140. The passive magnets 320 and 340n are rotated on the upper surface of the separating members 120 and 140 by means of the above frictional force.

By way of non-limiting example, the movable magnet 200 is motivated by the containing member 400, which can be shifted against the separating member 120 or 140 and either of the passive magnets 320, 340 is arranged on one surface of the separating member 120, 140 opposite to the other surface thereof adjacent to the movable magnet 200. In this case, each of the passive magnets 320, 340 has a cylindrical or spherical shape. Particularly, where each of the passive magnets 320, 340 is configured to have a cylindrical shape, it is further preferable that the passive magnets 320, 340 has a long rod-shape, that is that the passive magnets 320, 340 have a length longer than the outer diameter thereof so that the passive magnet 320, 340 is stably rotated.

Figure 3A:
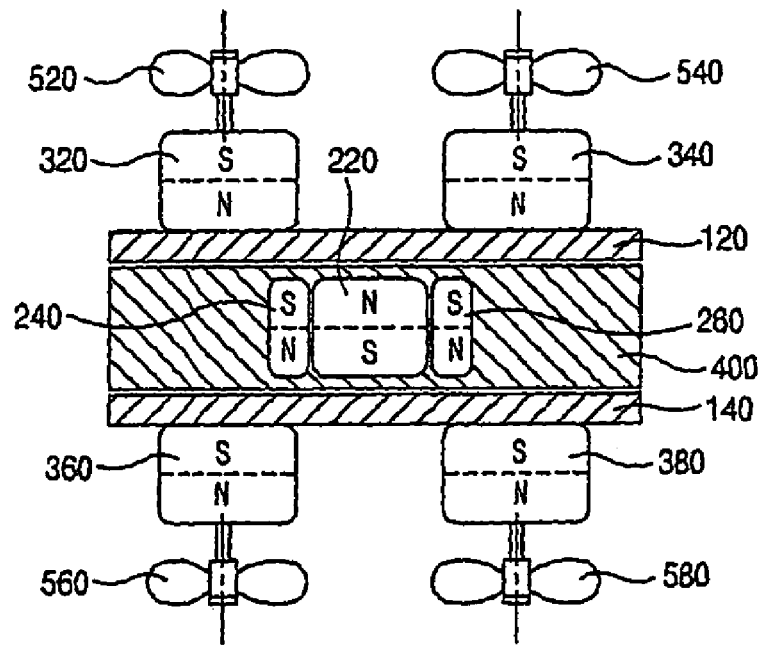
FIG. 3A is a cross-sectional view of a rotating apparatus using a magnet, in which three movable magnets are arranged, when a passive magnet is horizontally rotated.
Figure 3B:
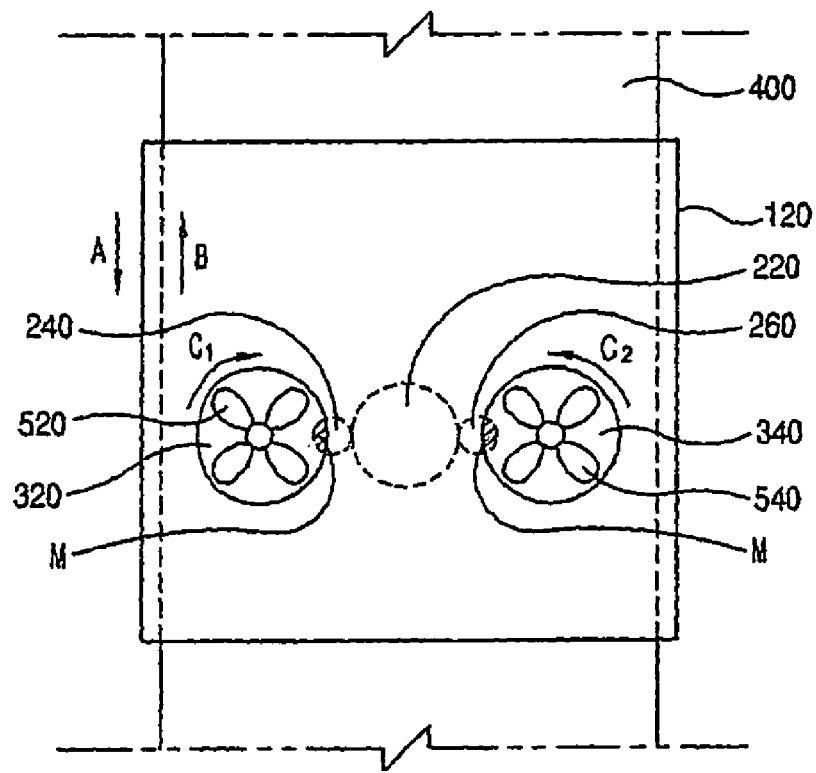
FIG. 3B is a top view of the rotating apparatus of FIG. 3a, illustrating the rotation and shift of the passive magnet positioned on an upper surface of a separating member.

In a rotating apparatus using a magnet shown in FIGS. 3A and 3B, at least two movable magnets 220, 240, 260 are coupled with a passive magnet 320, 340 by magnetic force. The rotating apparatus using a magnet shown in FIG. 3a comprises three movable magnets 220,240 and 260, of which N-poles or S-poles are alternately aligned along the lower surfaces of the upper and lower separating members 120 and 140 so that attractive force is applied there between. That is, the central movable magnet 220 is arranged such that the N-pole thereof faces the upper separating member 120 and the S-pole thereof faces the lower separating member 140. The side movable magnets 240 and 260 are arranged such that the S-poles thereof face the upper separating member 120 and the N-poles thereof face the lower separating member 140. Passive magnets 320, 340, 360 and 380 are arranged on the upper surfaces of the upper and lower separating members 120 and 140 so that the passive magnets 320,340, 360 and 380 interact with the movable magnets 220, 240 and 260 by magnetic force.

The N-pole of the passive magnet 320 has attractive force with the S-pole of the movable magnet 240, and repulsive force with the N-pole of the movable magnet 220. Accordingly, the passive magnet 320 is positioned close to the movable magnet 240. In the same manner, since the N-pole of the passive magnet 340 has attractive force with the S-pole of the movable magnet 260, and repulsive force with the N-pole of the movable magnet 220, the passive magnet 340 is positioned close to the movable magnet 260. For the same reason, the passive magnets 360 and 380 positioned on the lower separating member 140 are respectively positioned close to the movable magnets 240 and 260.

In still the same manner as the arrangement of the magnets shown in FIG. 1B, the regions 'M' (represented by the arcuate region defined by a chord in FIG. 3B), where the magnetic attractive force of the movable magnets 220, 240, and 260 applied to the passive magnets 320 and 340 is at a maximum, are eccentric from the center of the passive magnets 320 and 340. As shown in FIG. 3B, when the separating member 120 and the movable magnets 220,240 and 260 are shifted relatively to each other, the passive magnets 320 and 340 are rotated in the 'C$_1$' or 'C$_2$' direction without shift relative to the movable magnets 220, 240, or are shifted along the movable magnets 220, 240 in the 'B' direction and 260 and rotated in the 'C$_1$' or 'C$_2$' direction. The movement of the two passive magnets 360 and 380 positioned on the lower separating member 140 is the same as the above movement of the passive magnets 320 and 340.

In the rotating apparatus using a magnet shown in FIGS. 3A and 3B, the dimensions of the magnetic poles of the movable magnets 240 and 260 are smaller than that of the central movable magnet 220. Accordingly, the regions 'M' of the passive magnets 320 and 340, where the magnetic attractive force of the movable magnets 220,240 and 260 applied to the passive magnets 320 and 340 is at a maximum, are close to the outer circumference rather than the centers of rotation of the passive magnets 320 and 340. The longer the distance from the center of rotation to a point of action is, the larger the magnitude of the rotation torque acting on the passive magnets 320 and 340 is. As the rotation torque of the passive magnets generated from the relative shift of the movable magnets and the separating member increases, the rotary power of the passive magnets increases.

Figure 4A:
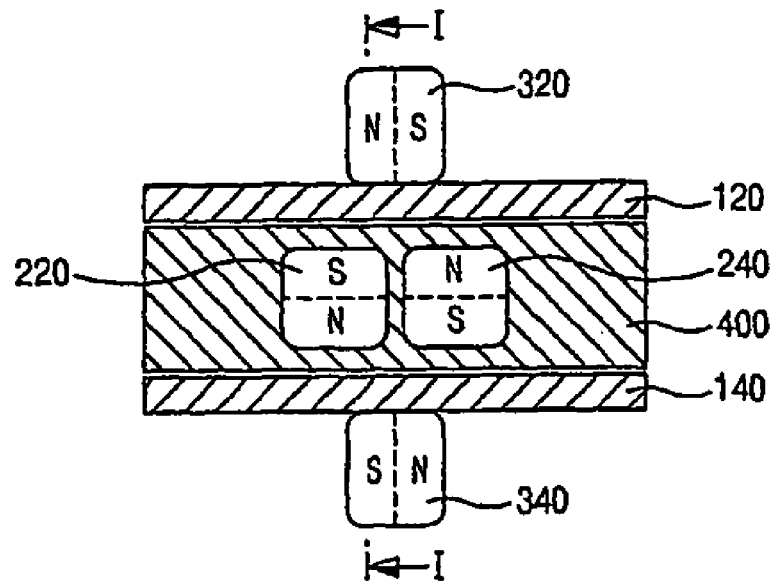
FIG. 4A is a cross-sectional view of a rotating apparatus using a magnet, in which two movable magnets are arranged, when a passive magnet is rollingly rotated.

Although FIGS. 3A and 3B illustrate the arrangement of three movable magnets, two movable magnets 220, 240 can be used as shown in FIG. 4A. In such a case, the passive magnets 320, 340 are horizontally rotated; the polarities of the magnetic pole faces of the passive magnets 320, 340 are situated on the separating member 120, 140 and are induced into rotation based on the polarities of the movable magnets 220, 240. As the two movable magnets 220, 240 are arranged, the passive magnets 320, 340, which are respectively close to the movable magnets, are arranged such that the polarities of the magnetic pole faces of the passive magnets 320, 340 situated on the separating member 120, 140 are opposite to each other.

Figure 4B:
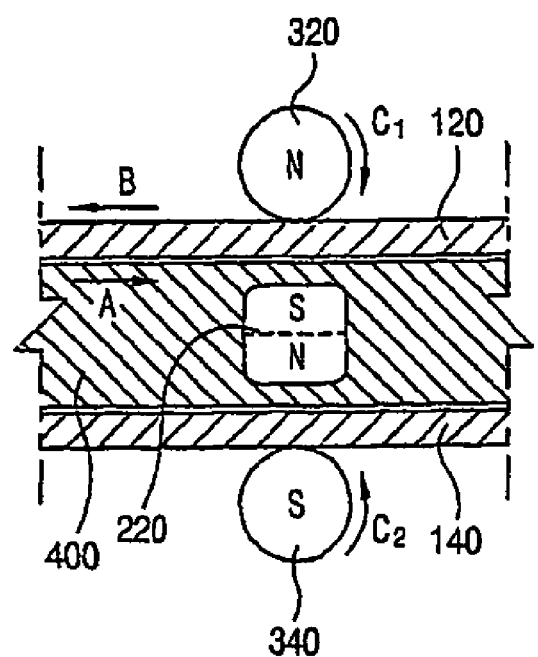
FIG. 4B is a cross-sectional view of the rotating apparatus of FIG. 4a taken along the line I-I.

Further, as shown in FIGS. 4A and 4B, the outer circumferences of the passive magnets 320 and 340, which are cylindrical double-sided two-poles magnets, are situated on the upper surfaces of the upper and lower separating members 120 and 140. That is, the passive magnets 320 and 340 are arranged such that they can be rollingly rotated. That is, the N-pole of the passive magnet 320 faces the S-pole of the movable magnet 220, and the S-pole of the passive magnet 320 faces the N-pole of the movable magnet 220. In the same manner, the S-pole of the passive magnet 340 faces the N-pole of the movable magnet 220 and the N-pole of the passive magnet 340 faces the S-pole of the movable magnet 220. In this arrangement, the passive magnets 320 and 340 are rotated by the relative shift of the separating members 120 and 140 and the movable magnets 220 and 240. That is, when the separating members 120 and 140 are shifted in the 'B' direction, the passive magnets 320 and 340 are rollingly rotated in the 'C$_1$' or 'C$_2$' direction without shifting relative to the movable magnets 220, 240. On the other hand, when the movable magnets 220 and 240 are shifted in the 'A' direction, the passive magnets 320 and 340 on the separating members 120 and 140 are shifted along the movable magnets 220 and 240 and rollingly rotated in the 'C$_1$' or 'C$_2$' direction.

Figure 5A:
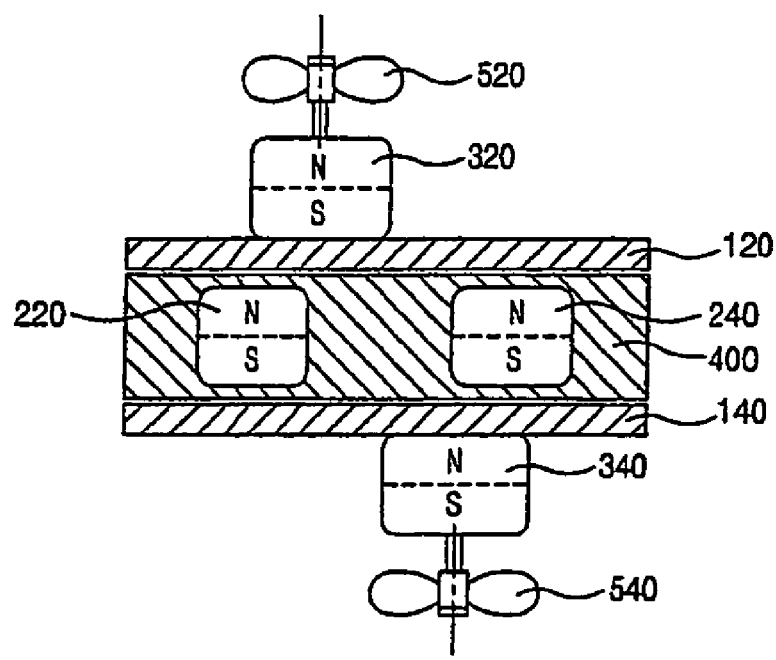
FIG. 5A is a cross-sectional view of a rotating apparatus using a magnet, in which two movable magnets are arranged so that repulsive force is formed between the two movable magnets.

FIGS. 3A and 4A illustrate the arrangement of the plurality of movable magnets 220, 240, 260, of which N-poles and S-poles are alternately aligned so that attractive force is applied there between. However, it is possible to align N-poles and S-poles of the movable magnets so that repulsive force is applied there between. That is, as shown in FIG. 5a, N-poles of the two movable magnets 220 and 240 face the upper separating member 120, and S-poles of the two movable magnets 220 and 240 face the lower separating member 140. Preferably, the two movable magnets 220 and 240 are separated from each other by a designated interval.

The passive magnets 320 and 340 are double-sided two-poles magnets, and any one magnetic pole face, i.e., N-pole or S-pole, of the passive magnets 320 or 340 is positioned on the upper surface of the separating members 120 and 140. Referring to FIG. 5A, the S-pole of the passive magnet 320 is positioned on the upper surface of the upper separating member 120, and the N-pole of the passive magnet 340 is positioned on the upper surface of the lower separating member 140. Here, the S-pole of the passive magnet 320 has attractive force with the N-pole of the movable magnet 220 and the N-pole of the movable magnet 240. In this case, the passive magnet 320 is positioned between the two movable magnets 220 and 240 such that the passive magnet 320 is close to any one of the two movable magnets 220 and 240. Accordingly, the attractive force between the passive magnet 320 and the close movable magnet 220 is larger than the attractive force between the passive magnet 320 and the distant movable magnet 240. The magnetic attractive force of the movable magnets 220 and 240 is not uniformly applied to the passive magnet 320, but is stronger to the regions 'M' (represented by the arcuate region defined by a chord in FIG. 5B).

Figure 5B:
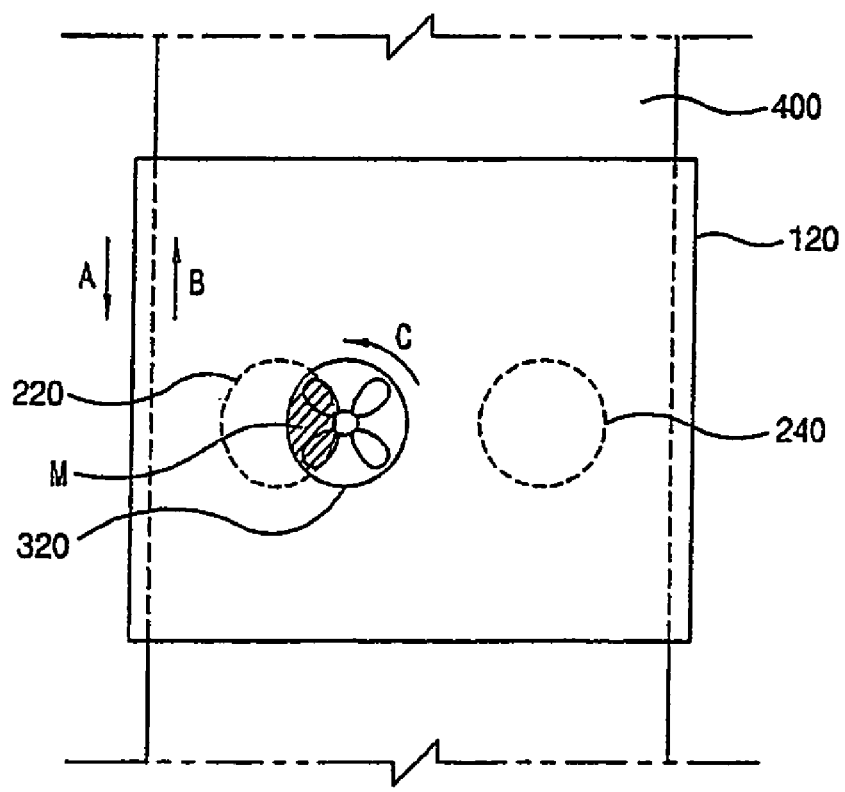
FIG. 5B is a top view of the rotating apparatus of FIG. 5A, illustrating the rotation and shift of a passive magnet positioned on an upper surface of a separating member.

In the arrangement of magnets shown in FIG. 5B, when the separating member 120 and the movable magnets 220 and 240 are shifted relatively to each other, the friction force between the passive magnet 320 and the separating member 120 is large at the region 'M', thereby generating rotation torque to the passive magnet 320. Accordingly, when the separating member 120 is shifted relatively to the movable magnets 220 and 240 in the 'A' direction, the passive magnet 320 is rotated in the 'C' direction without shifting position relative to the movable magnets 220 and 240. On the other hand, the movable magnets 220 and 240 are shifted relatively to the separating member 120 in the 'B' direction, the passive magnet 320 is shifted along the movable magnets 220 and 240 in the "B' direction and rotated in the 'C' direction.

In the rotating apparatus using a magnet shown in FIGS. 1 to 5, the magnetic attractive force of the movable magnets 220, 240 applied to the passive magnets 320, 340 is strong at a designated region of the passive magnets through the arrangement of the movable magnets 220, 240 and the passive magnets 320, 340, thereby inducing the generation of rotational torque. In the same manner, offsetting means 600 are arranged on the upper surfaces and lower surfaces of the respective separating members 120 and 140, as shown in FIGS. 6A and 6B, thereby allowing the passive magnets 320, 340 to be eccentric to the movable magnets.

Figure 6A:
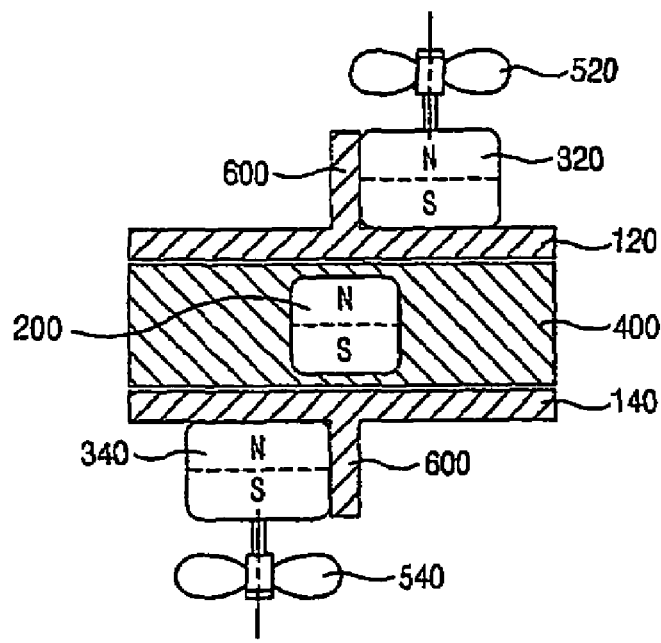
FIG. 6A is a cross-sectional view of a rotating apparatus using a magnet, in which an isolating member is positioned on an upper surface of a separating member.

That is, as shown in FIG. 6A, the N-pole and S-pole of the movable magnet 200 respectively face the upper and lower separating members 120 and 140 and isolating members 600 are arranged on the upper surfaces of the upper and lower separating members 120 and 140 opposite to the movable magnet 200. Preferably, the isolating members 600 are arranged along a route where the separating members 120 and 140 and the movable magnet 200 are shifted relatively to each other. Further, preferably, the isolating member 600 is made of nonmagnetic material. The isolating member 600 may, optionally, be manufactured integrally with the separating members 120 and 140, or, alternatively, manufactured as a separate assembly from the separating members 120 and 140 and configured to contact the separating members 120 and 140. The passive magnets 320 and 340 are arranged on one or both sides of the isolating members 600 such that any one magnetic pole face of each of the passive magnets 320 and 340 is situated on the upper surface of the separating member 120 or 140, thereby being coupled with the movable magnet 200 by magnetic force. The passive magnets 320 and 340 are arranged such that they are horizontally rotated.

Figure 6B:
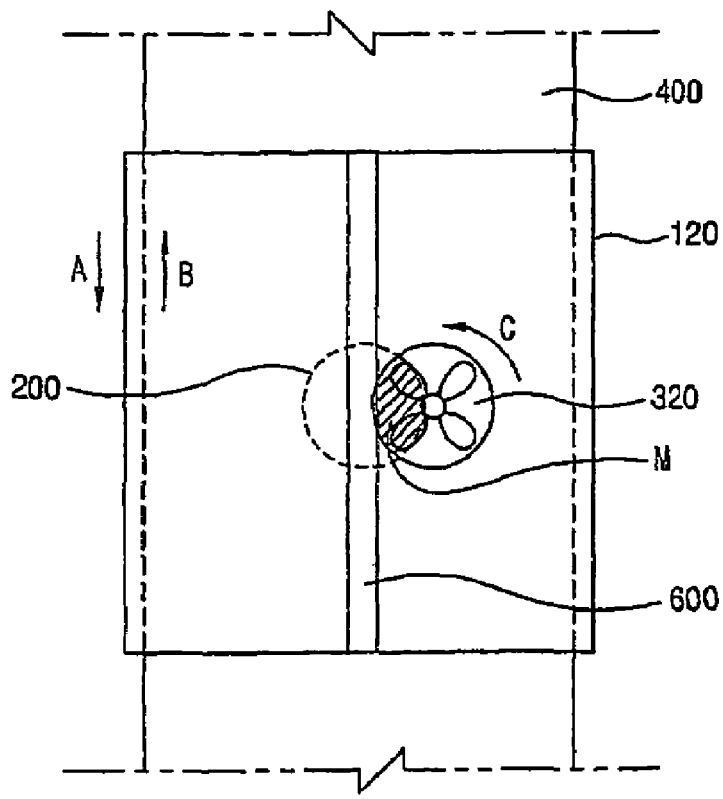
FIG. 6B is a top view of the rotating apparatus of FIG. 6A, illustrating the rotation and shift of a passive magnet along the isolating member and a movable magnet.

In the rotating apparatus using a magnet shown in FIG. 6B, the passive magnet 320 is close to one side region of the movable magnet 200 due to the isolating member 600. Accordingly, the magnetic attractive force of the movable magnet 200 applied to the passive magnet 320 is stronger at the region 'M' than at any other regions. In this arrangement of the magnets, as the separating member 120 and the movable magnet 200 are shifted relatively to each other, the friction force between the passive magnet 320 and the separating member 120 is large at the region 'M', thereby generating rotation torque to the passive magnet 320.

When the separating member 120 is shifted relatively to the movable magnet 200 in the 'A' direction, the passive magnet 320 is rotated in the 'C' direction without shifting position relative to the movable magnet 200. On the other hand, the movable magnet 200 is shifted relatively to the separating member 120 in the 'B' direction; the passive magnet 320 is shifted along the movable magnet 200 in the 'B' direction and rotated in the 'C' direction.

Various arrangements of the separating members, movable magnets and passive magnets of the rotating apparatus in accordance with the present invention have been described. The arrangements of the components described include the cases wherein the passive magnets 320, 340 are horizontally rotated and have been described with reference to FIGS. 1A, 1B, 3A, 3B, 5A, 5B, 6A, and 6B, and the arrangements of the component wherein the passive magnets 320, 340 are rollingly rotated and have been described with reference to FIGS. 2A, 2B, 3, 4A, and 4B.

With reference to FIGS. 6A and 6B, the movable magnets 200 and the separating members 120 140 of the rotating apparatus of the present invention are shifted relatively to each other, thus being displaced from each other. Composed in this manner, the movable magnets 200 are fixed and the separating members 120, 140 are shifted, or the separating members 120, 140 are fixed and the movable magnets 200 are shifted. Accordingly, the rotation of the passive magnets 320, 340 is induced by simply shifting the movable magnets 200 and the separating members 120, 140 relatively to each other, rather than by directly rotating the movable magnets 200 and transmitting the rotary force to the passive magnets 320, 340.

In case that a plurality of the movable magnets 200 are shifted relatively to the separating member 120, it is preferable that containing members 400 are used. The plural movable magnets 200 are simultaneously shifted relatively to the separating member 120, 140 by shifting the containing members 400 using driving means. In case that the containing members 400 are used, the containing members 400 are arranged such that they can be shifted relatively to the separating member 120, 140. The use of the containing members 400 allow the plural movable magnets to be arranged in a designated pattern and plural passive magnets to be arranged on the upper surface of the separating member in various patterns, thereby simultaneously rotating the plural magnets.

Figure 7A:
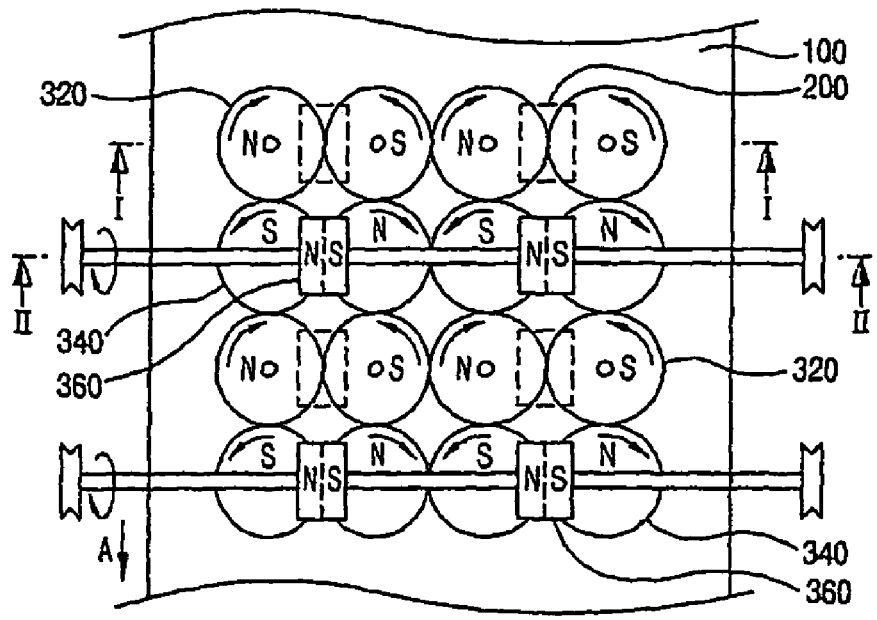
FIG. 7A is a top view of a rotating apparatus using a magnet, in which a plurality of movable magnets and a plurality of passive magnets are arranged to provide a plurality of rotary shafts.
Figure 7B:
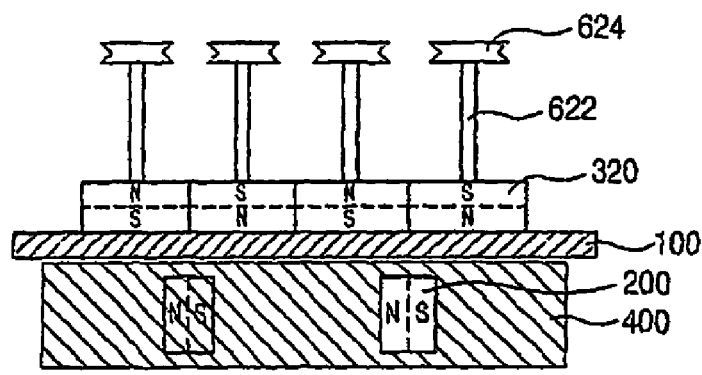
FIG. 7B is a cross-sectional view of the rotating apparatus of FIG. 7A taken along line I-I.
Figure 7C:
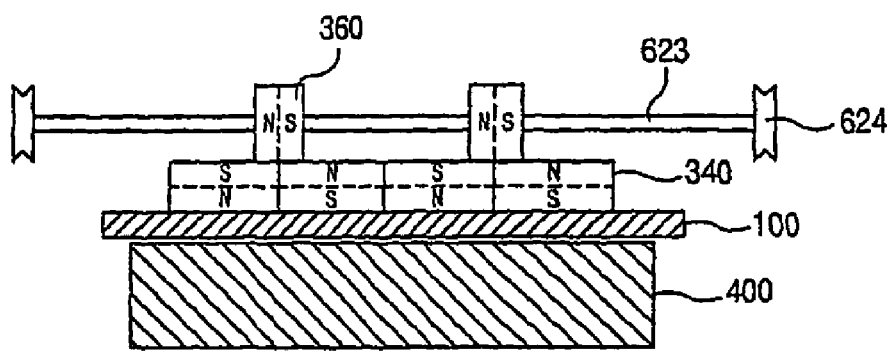
FIG. 7C is a cross-sectional view of the rotating apparatus of FIG. 7A taken along the line II-II.

FIGS. 7A to 7C illustrate a rotating apparatus using a magnet, in which a plurality of movable magnets and a plurality of passive magnets are arranged.

FIG. 7A is a top view, in which a plurality of movable magnets 200 and a plurality of passive magnets 320, 340, 360 are arranged. FIG. 7B is a cross-sectional view of the rotating apparatus of FIG. 7A taken along the line 1-1. FIG. 7C is a cross-sectional view of the rotating apparatus of FIG. 7A taken along the line II-II.

In the rotating apparatus shown in FIGS. 7A to 7C, a plurality of movable magnets 200 are positioned in a containing member 400, and are separated from each other by designated intervals. Each of the movable magnets 200 has the same arrangement as that of FIG. 1A relative to one of the passive magnets 320, 340, 360. Any one magnetic pole faces, i.e., N-poles or S-poles, of the passive magnets 320 and 340 are positioned on the upper surface of a separating member 100 in a fashion to allow attraction with the opposite pole respectively of the movable magnet 200.

The passive magnets 320 are coupled with the movable magnets 200 through the separating member 100 by means of magnetic force. As shown in FIG. 7B, two passive magnets 320 are coupled with one movable magnet 200, and the passive magnets 320 are arranged such that attractive force is formed between the passive magnet 320 and the neighboring passive magnet 320. As shown in FIG. 7C, the rotating apparatus may include passive magnets 340, which are not coupled with the movable magnets 200. In this case, the passive magnets 340, which are not coupled with the movable magnets 200, contact the passive magnets 320, which are coupled with the movable magnets 200, and the passive magnets 320 and 340 are arranged such that attractive force is formed between the passive magnet 320 and the neighboring passive magnet 340. In case that the passive magnets 320 and 340 contact each other, it is preferable that passive magnets 320 and 340 have circular cross sections. When the passive magnets 320, which are directly coupled with the movable magnets 200, are rotated, the passive magnets 340 contacting the passive magnets 320 are rotated together with the rotation of the passive magnets 320. The above arrangement reduces the number of the movable magnets 200 required to rotate the plural passive magnets.

The rollingly-rotated passive magnets 360 have cylindrical or disk shapes, and outer circumferences thereof contact the upper surfaces of the neighboring passive magnets 320 or 340. Rotary shafts of the rollingly-rotated passive magnets 360 are parallel with the upper surface of the separating member 100. Accordingly, when the passive magnets 320 and 340 are horizontally-rotated, the passive magnets 360 are rollingly-rotated. The above arrangement simultaneously rotates the passive magnets 340 designed to be horizontally-rotated and the passive magnets 360 designed to be rollingly-rotated.

Particularly, FIGS. 7B and 7C illustrate the passive magnets 320, 340, and 360, to which rotary shafts 622 and 623 and pulleys 624 are connected. In FIG. 7B, the rotary shafts 622 are connected to the horizontally rotated passive magnets 320 and extended upward in a direction perpendicular to the upper surface of the separating member 100. In FIG. 7C, the rotary shafts 623 are connected to the rollingly-rotated passive magnets 360 and extended horizontally in a direction to parallel with the upper surface of the separating member 100. Here, when the containing member 400, in which the movable magnets 200 is arranged, is fixed and the separating member 100 is shifted in the direction, shown by an arrow 'A' in FIG. 7A, using a conveyor unit, the plural passive magnets 320, 340, and 360 are horizontally- and rollingly-rotated without shift. Further, the pulleys 624 connected to ends of the rotary shafts 622 and 623 are connected to an apparatus (not shown) for transmitting rotary force through a belt (not shown). The rotary force of the passive magnets 320 and 360 is transmitted to rotary members of the apparatus through the rotary shafts 622 and 623, the pulleys 624 and the separating member 100.

Since the rotary shafts 622 and 623 are respectively connected to a plurality of the passive magnets 320, 340 and 360, the rotating apparatus using a magnet shown in FIGS. 7A to 7C can be applied to machinery requiring a plurality of rotary shafts and a power transmission gear. Further, the above rotating apparatus provides two type rotary shafts 622 and 623, which are perpendicular to each other, thus transmitting the rotary force thereof to components of various machinery.

FIGS. 8 through 11 illustrate additional components of the rotating apparatus using a magnet in accordance with the present invention.

Figure 8:
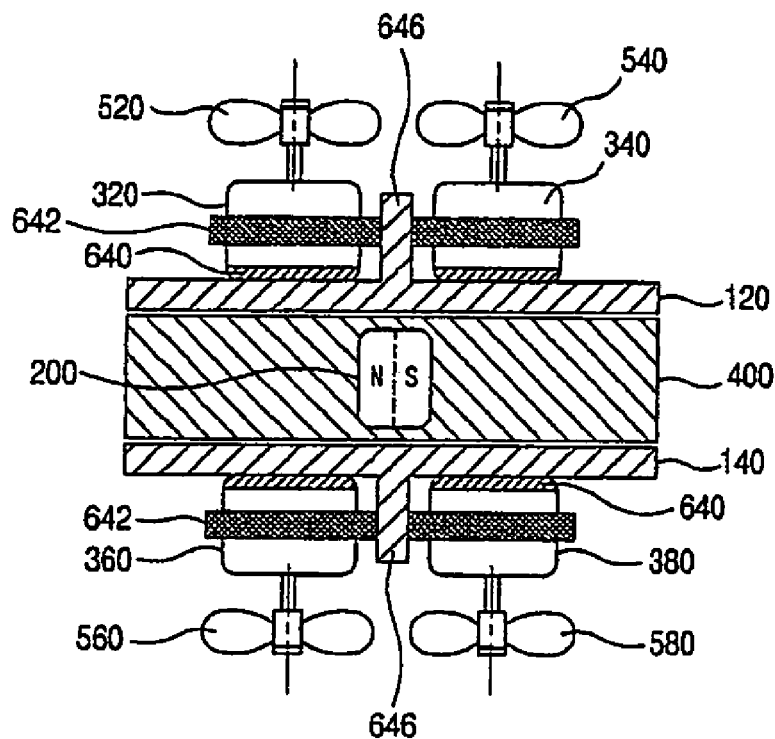
FIG. 8 is a cross-sectional view of a rotating apparatus using a magnet, in which various means, for reinforcing the rotary force of a passive magnet in case that the passive magnet is horizontally rotated, are arranged.

First, FIG. 8 illustrates various means, for reinforcing the rotary force of passive magnets which are horizontally rotated. In case that one magnetic pole faces of the passive magnets 320, 340, 360 and 380 are situated on the separating members 120 and 140, friction members 640 are attached to the magnetic pole faces of the passive magnets 320, 340, 360 and 380 situated on the separating members 120 and 140. Preferably, the friction members 640 are made of a material having a large coefficient of friction with the separating members 120 and 140. As described above, the rotary force of the passive magnets 320, 340, 360 and 380 is improved by increasing the coefficient of friction between the passive magnets 320, 340, 360, and 380 and the separating members 120 and 140. The friction members 640 are affixed to one surfaces of the passive magnets 320, 340, 360 and 380 or by forming a coating layer having a large coefficient of friction on one surfaces of the passive magnets 320, 340, 360 and 380 using a spray.

The arrangement of magnets shown in FIG. 8 employs the arrangement of magnets shown in FIG. 1A. Here, a plurality of passive magnets 320, 340, 360, and 380 correspond to one movable magnet 200. In case that two passive magnets either of 320 and 340 or of 360 and 380 are arranged so as to be in contact with each other, it is preferable that the passive magnets 320, 340, 360, and 380 have cylindrical or disk shapes. In this case, a friction ring 642 is positioned along the outer circumferences of the cylindrical passive magnets 320, 340, 360, and 380. The frictional force between the neighboring passive magnets 320, 340, 360 and 380 is thereby increased, thus reinforcing the rotary force of the passive magnets 320, 340, 360 and 380.

Further, as shown in FIG. 8, vertical friction plates 646 interposed between the neighboring passive magnets 320 and 340 or 360 and 380 are positioned on the upper surface of the separating members 120 and 140. Thereby, it is possible to reinforce the rotary force of the rotated passive magnets 320, 340, 360 and 380. The vertical friction plates 646 are extended integrally from-the separating members 120 and 140, or are manufactured separately and are then attached to the separating members 120 and 140. Preferably, the vertical friction plate 646 is extended along the route by which the movable magnet 200 is shifted relatively to the separating members 120 and 140.

Figure 9:
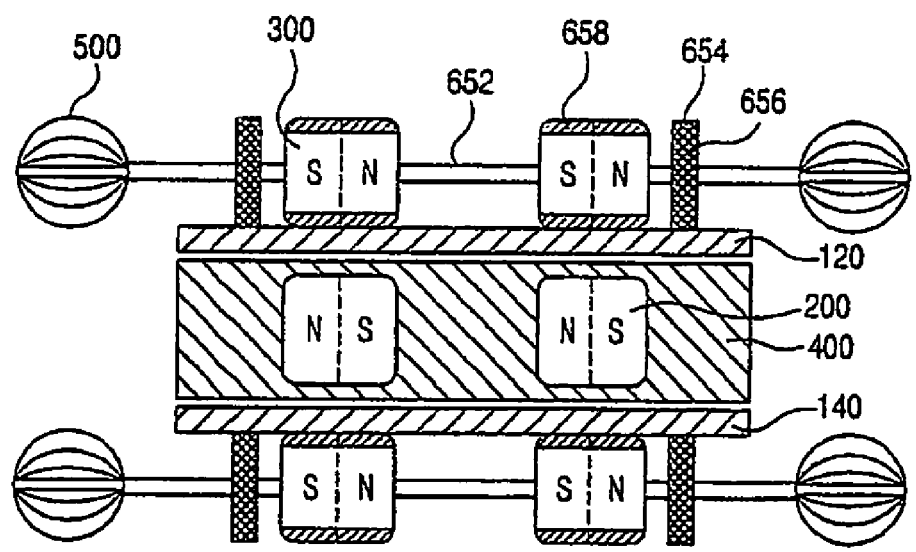
FIG. 9 is a cross-sectional view of a rotating apparatus using a magnet, in which various means, for reinforcing the rotary force of a passive magnet in case that the passive magnet is rollingly rotated, are arranged.

FIG. 9 illustrates means for reinforcing the rotary force of passive magnets 300. As shown in FIG. 9, bars 652 are formed on rotary centers of the passive magnets 300, which are rollingly rotated. Circular friction plates 654 are installed at ends of the bars 652. The circular friction plates 654 are rollingly rotated on the upper surfaces of the separating members 120 and 140 based on the rotation of the passive magnet 300, and increases coefficient of friction with the separating members 120 and 140 by forming friction surfaces 656 on the outer circumferences thereof. Thereby, the passive magnets 300 can be stably rotated on the separating members 120 and 140 without slipping. Rubber coating layers 658 are formed on the outer circumferences of the passive magnets 300, thereby improving friction force between the passive magnets 300 and the separating members 120 and 140.

The friction members 640, the friction rings 64-2, the vertical friction plates 646, the circular friction plates 654 and the rubber coating layers 658 are means for enhancing the rotation force of the passive magnets 300. The above means for enhancing the rotation force of the passive magnets 300 serve to allow the passive magnets 300 to be stably rotated. In case that a rotating structure, such as a decoration, is attached to the passive magnets 300, the passive magnets 300 cannot be stably rotated but may tend to skid across the separating members 120, 140 due to the weight of the rotating structure. In such a case, the use of the above described rotary force enhancing means 658 prevents the passive magnets 300 from skidding across the separating members 120, 140. Accordingly, it is possible to stably rotate the passive magnets 300 even as the passive magnets 300 are used to motivate a great mass.

Figure 10A:
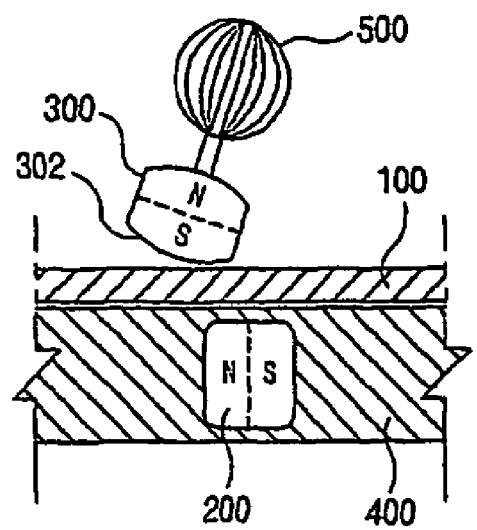
FIG. 10A is a cross-sectional view illustrating a passive magnet, of which a surface situated on a separating member is formed into a curved shape.
Figure 10B:
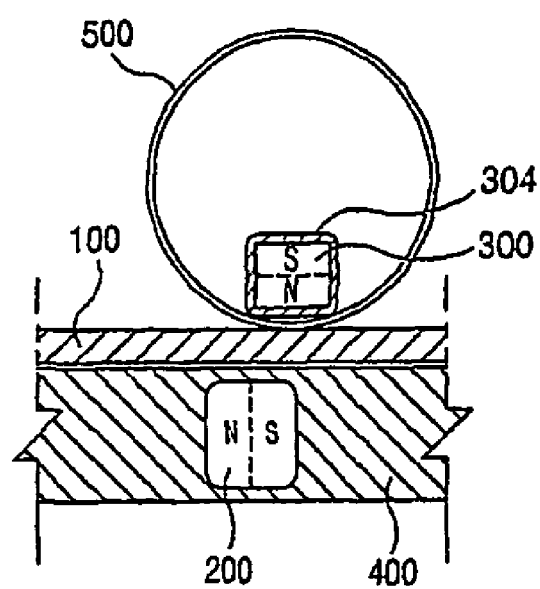
FIG. 10B is a cross-sectional view illustrating a passive magnet, which is positioned in a circular structure.

FIG. 10A illustrates the passive magnet 300, of which a surface 302 situated on a separating member 100 is formed into a curved shape. The curved surface 302 of the passive magnet 300 decreases a contact area between the passive magnet 300 and the separating member 100. Accordingly, it is possible to smoothly rotate the passive magnet 300. Further, a circular structure 500 containing the passive magnet 300 as shown in FIG. 10B has the same effect as the curved surface 302 of the passive magnet 300 as shown in FIG. 10A. Here, in case that friction force between the inner surface of the circular structure 500 and the passive magnet 300 is small, the passive magnet 300 stalls. An embodiment includes a coating agent made of rubber or other resilient surface to enhance the coefficient of friction between the passive magnet 300 and the circular structure 500 to better motivate the passive magnet 300 to drive the circular structure 500 along.

Where the passive magnet 300 is positioned in a hollow of the circular structure 500 as shown in FIG. 10B, the circular structure 500 is selectively arranged on a left or right side of the movable magnet 200. The position of the passive magnet 300 can be changed within the hollow of the circular structure 500. Accordingly, where the circular structure 500 is arranged on the N-pole of the movable magnet 200, the position of the passive magnet 300 is changed so that the S-pole of the passive magnet 300 has attractive force with the N-pole of the movable magnet 200. Conversely, in case that the circular structure 500 is arranged on the S-pole of the movable magnet 200, the position of the passive magnet 300 is changed so that the N-pole of the passive magnet 300 has attractive force with the S-pole of the movable magnet 200.

In a decoration or a toy, the rotating structure may be arranged at various positions based on purposes of a user. Various shapes of the circular structure 500, which includes a space for changing the position of the passive magnet 300 therein, may be employed. The movements of the passive magnets 300, which are shifted and rotated on the separating members 120, 140, are divided into the horizontal rotation and the vertical rotation, as described above. Further, the arrangements of the movable magnets and the passive magnets in case that the passive magnets are horizontally or rollingly rotated have been described with reference to FIGS. 1 through 6 above.

Figure 11:
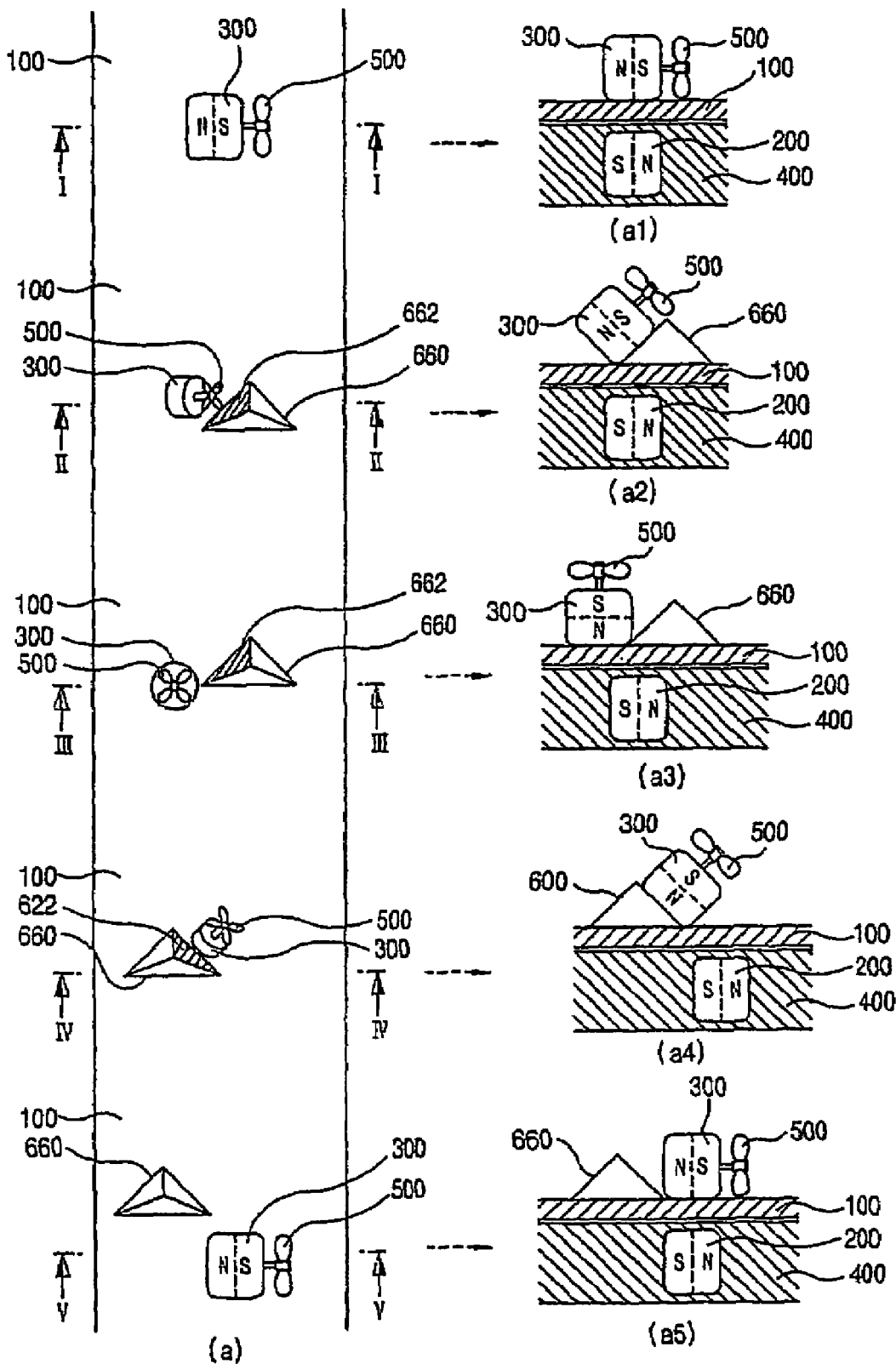
FIG. 11 is a schematic view illustrating the change of the arrangement of a passive magnet from horizontal rotation to rolling rotation or from rolling rotation to horizontal rotation using an inclined protrusion formed on an upper surface of a separating member.

FIG. 11 illustrates changing means of the passive magnets for changing the arrangement of the passive magnets from horizontal rotation to rolling rotation or from rolling rotation to horizontal rotation. FIG. 11A is a top view illustrating the arrangement of the changing means on a route where the passive magnets move along the upper surface of the separating means, FIGS. 11(a1) to 11(a5) are cross-sectional views of FIG. 11 a, respectively taken along the lines I-I to V-V.

As shown in FIG. 11A, an inclined protrusion 660 sloping on at least one side thereof is formed on the upper surface of the separating member 100, thus serving as the changing means. More specifically, the inclined protrusion 660 having a triangular pyramid shape is formed on the upper surface of the separating member 100. The inclined protrusion 660 is arranged at a designated position along a route where the separating member 100 and the movable magnet 200 are shifted relatively to each other.

First, the passive magnet 300 rollingly rotated at the position of I is shifted along the upper surface of the separating member 100, and reaches the position of II provided with the inclined protrusion 660 formed thereon. Here, the passive magnet 300 is inclined to one side due to a sloping side 662 of the inclined protrusion 660. When the separating member 100 is continuously shifted, the passive magnet 300 is changed to the arrangement of horizontal rotation at the position of III. In case that another inclined protrusion 660 is formed, the passive magnet 300 is inclined to one side at the position of IV.

When the separating member 100 is continuously shifted, the passive magnet 300 is changed to the arrangement of rolling rotation at the position V.

As described above, the arrangement of the passive magnet 300 is changed from the rolling rotation to the horizontal rotation or from the horizontal rotation to the rolling rotation by forming the inclined protrusion 660 on the separating member 100. Accordingly, in case that the rotating apparatus using a magnet in accordance with the present invention is applied to a decoration or a toy, the rotating apparatus is used as a structure, which is energetically rotated.

Although the inclined protrusion 660 shown in FIG. 11 has a triangular pyramid, the inclined protrusion 660 may have various shapes.

The rotating apparatus using a magnet in accordance with the present invention may comprise one movable magnet and one passive magnet, or a plurality of movable magnets arranged to a containing member and integrally driven so that a plurality of passive magnets coupled with each of the movable magnets are simultaneously rotated. Hereinafter, various driving means for relatively shifting containing members and separating members will be described with reference to FIGS. 12 to 20. The driving means, will be described, is one embodiment, and those skilled in the art will appreciate that other driving means are possible, as long as the driving means can shift the containing members and the separating members relatively to each other.

Figure 12A:
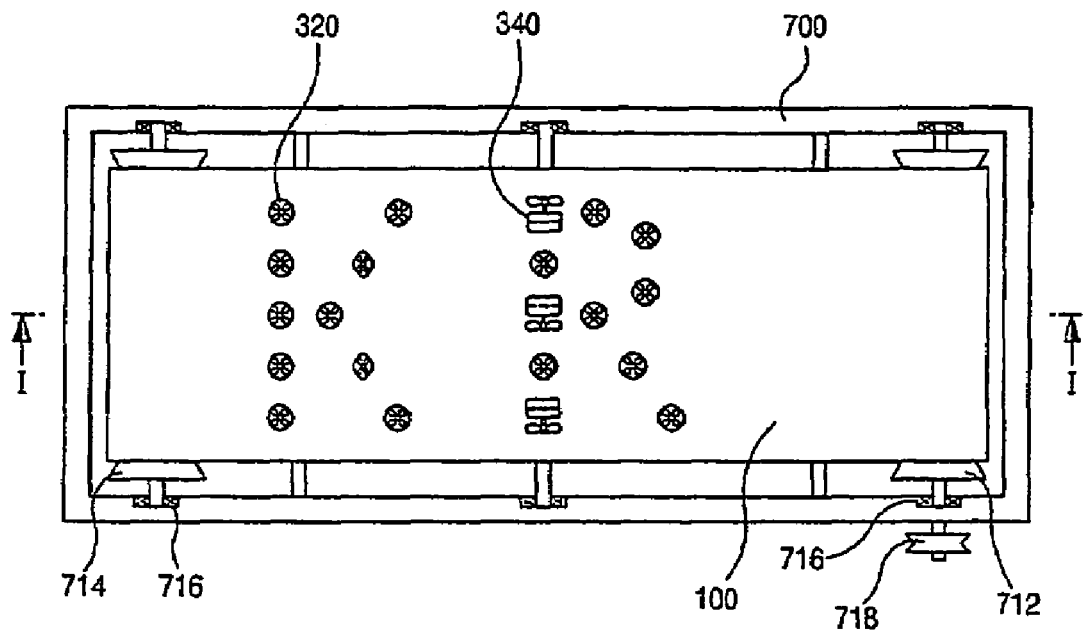
FIG. 12A is a top view of a rotating apparatus using a magnet, in which a separating member is a conveyor belt.
Figure 12B:
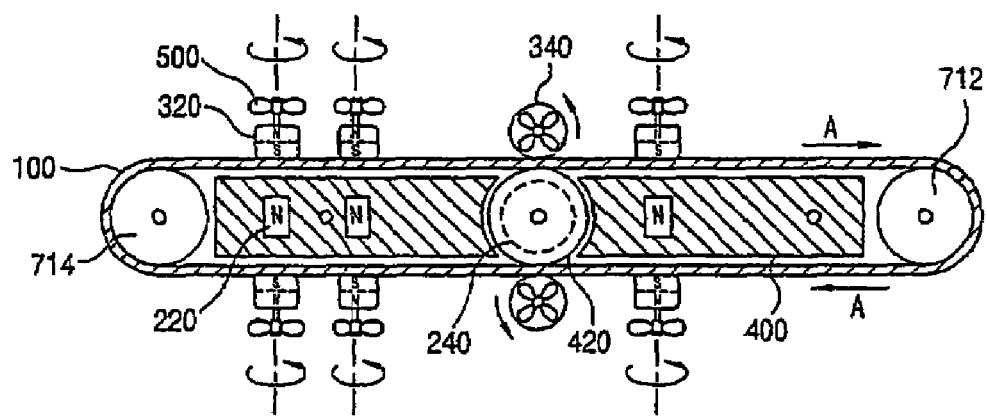
FIG. 12B is a cross-sectional view of the rotating apparatus of FIG. 12A taken along the line I-I.

FIGS. 12A and 12B illustrate a conveyor device for shifting the separating member relatively to the containing member. As shown in FIGS. 12A and 12B, the separating member is embodied as a conveyor belt 100. Both ends of the conveyor belt 100 is coupled with rollers 712 and 714, and both ends of the rollers 712 and 714 are rotatably connected to a supporter 700 by bearings 716. A pulley 718 is connected to one end of a rotary shaft of the roller 712. The pulley 718 is connected to a driving motor (not shown) by a belt (not shown), and is rotated. Accordingly, rotary force generated from the driving motor is transmitted to the roller 712 through the pulley 718, thereby driving the conveyor belt 100.

As shown in FIG. 12B, below the conveyor belt 100, a containing member 400, in which a plurality of movable magnets 220 are separated from each other by designated intervals, is fixed to the supporter 700. The outer surface of the containing member 400 is close to the inner surface of the conveyor belt 100. In this case, it is preferable that the containing member 400 is spaced from the conveyor belt 100 by a designated distance in order to efficiently move the conveyor belt 100. Further, it is preferable that a roller 420 is arranged in the conveyor belt 100 in order to prevent the sagging of the conveyor belt 100 and to achieve the smooth movement of the conveyor belt 100. Here, a movable magnet 240 may be arranged in the roller 420.

The arrangement of the movable magnets 220 and 240 and the passive magnets 320 and 340 is the same as the arrangement shown in FIGS. 1 to 6. In FIGS. 12A and 12B, the movable magnet 220 and the passive magnet 320 have the arrangement of horizontal rotation, and the movable magnet 240 and the passive magnet 340 have the arrangement of rolling rotation.

In the rotating apparatus using a magnet shown in FIGS. 12a and 12b, the containing member is fixed and the separating member is the conveyor belt shifted relatively to the containing member. For example, when the conveyor belt 100 is shifted in the direction represented by arrow 'A' as shown in FIG. 12B, a plurality of the passive magnets 300 are rotated without shift. In case that a plurality of movable magnets 220 and 240 are arranged in various patterns in the containing members 400 and 420, a plurality of passive magnets 320 and 340 are arranged in various patterns. When rotating structure having various shapes are respectively attached to the passive magnets 320 and 340, the rotating apparatus using a magnet in accordance with the present invention is applied to a toy, an interior decoration, an advertising sign, etc. For example, as shown in FIG. 12a, the passive magnets 320 and 340 are arranged to form the pattern of a character 'KR', and various rotating structures 500 are respectively attached to the passive magnets 320 and 340.

Figure 13A:
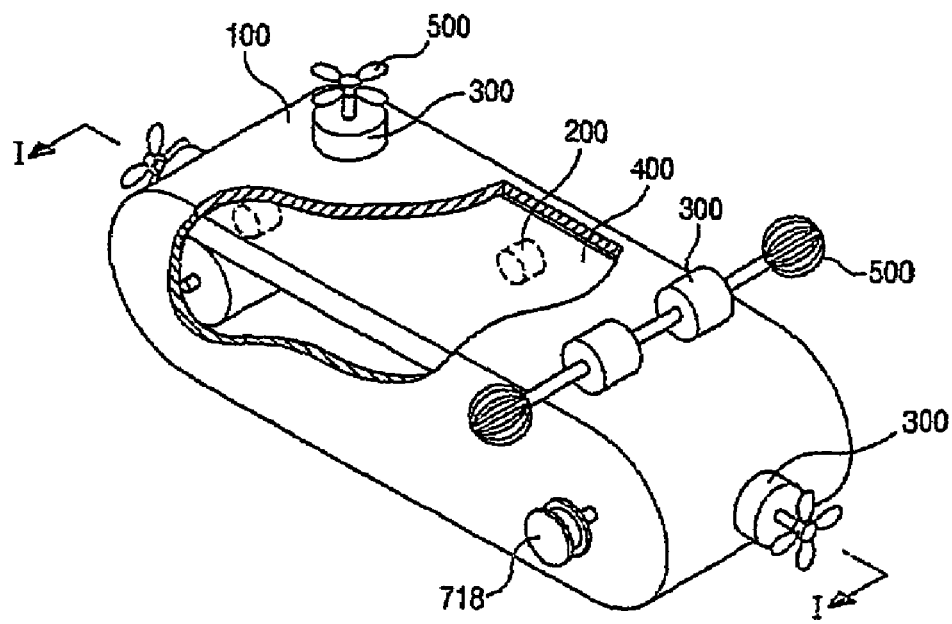
FIG. 13A is an exploded perspective view of a rotating apparatus using a magnet, in which a containing member is a conveyor belt.
Figure 13B:
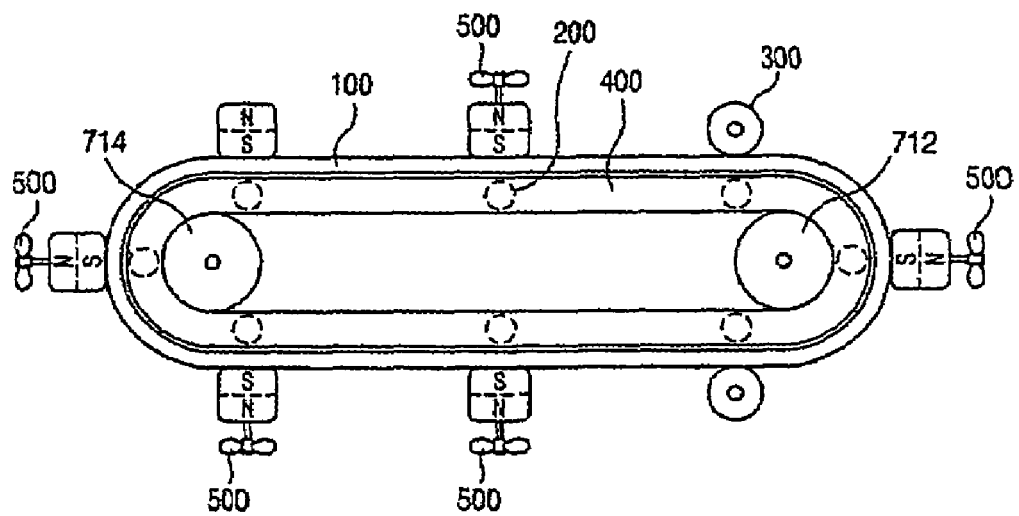
FIG. 13B is a cross-sectional view of the rotating apparatus of FIG. 13a taken along the line I-I.

FIGS. 13A and 13B illustrate a conveyor device for fixing a separating member and shifting a containing member. That is, the containing member is produced into a conveyor belt 400 accommodating a plurality of the movable magnets 200. Both sides of the conveyor belt 400 are coupled with rollers 712 and 714, and a pulley 718 is connected to one end of the roller 712. The pulley 718 is connected to a driving motor by a belt (not shown). The separating member 100 is embodied as a case covering the outer surface of the conveyor belt 400. When rotary force generated from the driving motor is transmitted to the roller 712 through the pulley 718, the conveyor belt 400 is shifted relatively to the separating member 100. Accordingly, the passive magnets 300 arranged outside the separating member 100 are shifted along the movable magnets 200, and rotated.

Figure 14A:
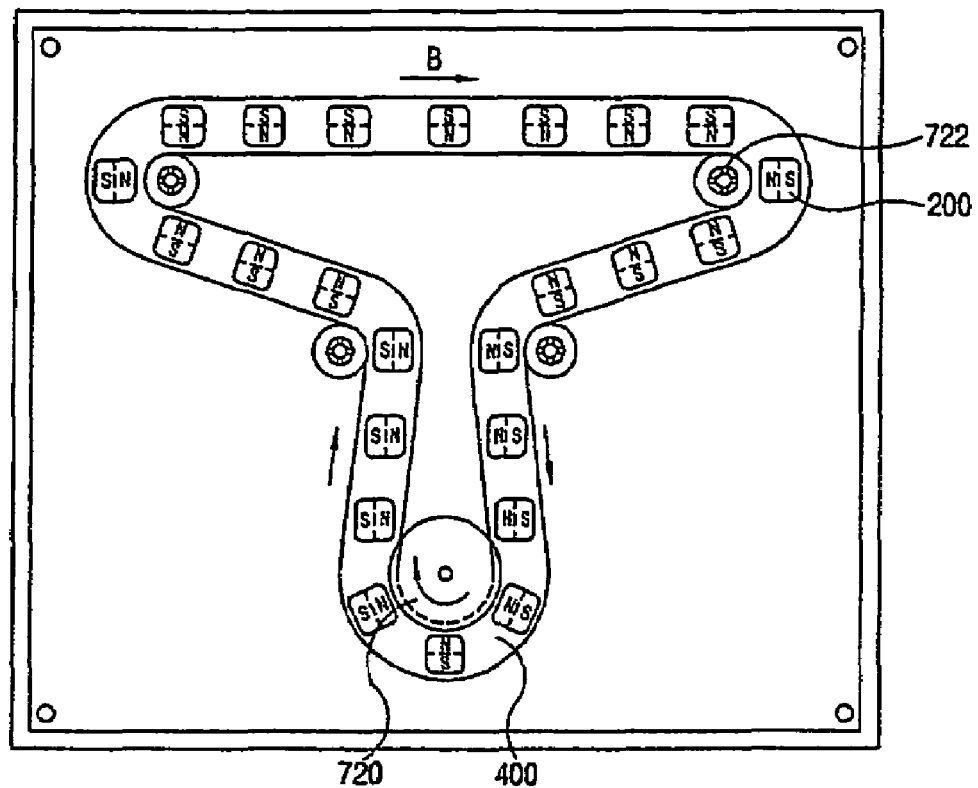
FIG. 14A is a schematic view of a rotating apparatus using a magnet, in which a containing member is a conveyor belt formed in a T shape, illustrating the arrangement of the containing member and a movable magnet.
Figure 14B:
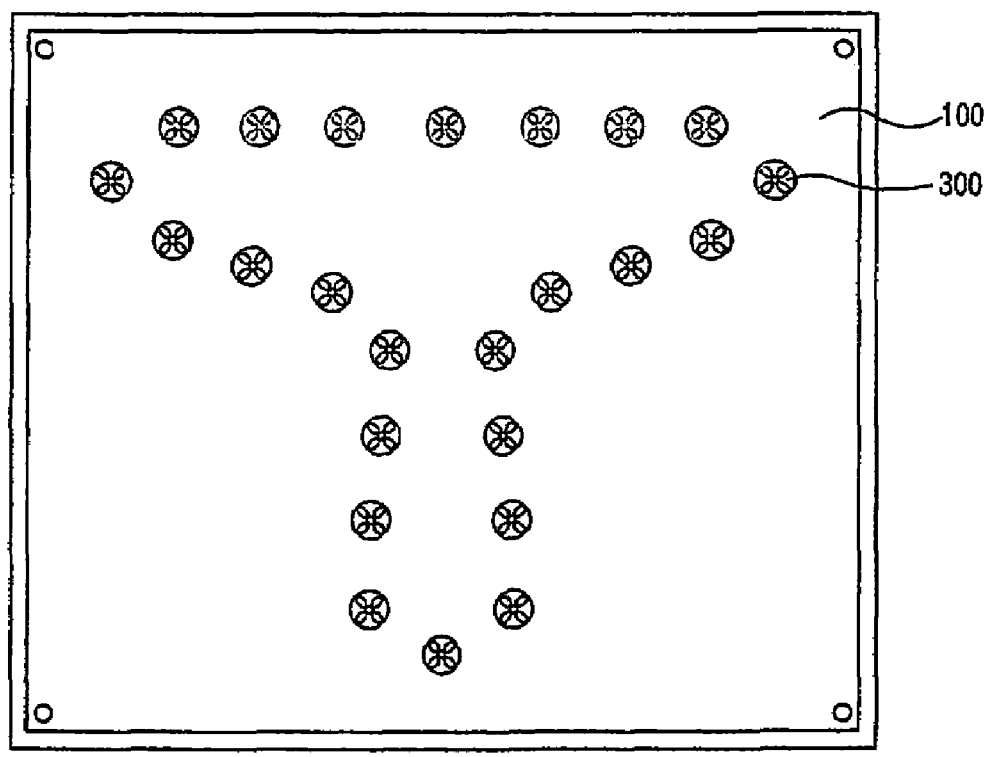
FIG. 14B is a top view illustrating the rotation and shift of a passive magnet on an upper surface of a separating member formed in a flat plate shape.

FIGS. 14A and 14B illustrate another embodiment of the containing member embodied as a conveyor belt. As shown in FIG. 14A, the conveyor belt 400 serving as the containing member have various patterns using a plurality of rollers 722. Here, the separating member 100 is embodied as a flat plate positioned adjacent to the conveyor belt 400 for covering the conveyor belt 400. The conveyor belt 400 having a designated pattern is positioned under the separating member 100.

When the conveyor belt 400 serving as the containing member is shifted by a driving roller 720 in the direction represented by arrow 'B', the passive magnets 300 arranged on the outer surface of the separating member 100 are shifted along the movable magnets 200, and rotated. FIG. 14B illustrates the rotation and shift of the passive magnets 300 positioned in a 'T'-shape on the outer surface of the separating member 100.

As described above, the rotating apparatus using a magnet in accordance with the present invention is applied to an interior decoration or advertising sign having various shapes.

Figure 15A:
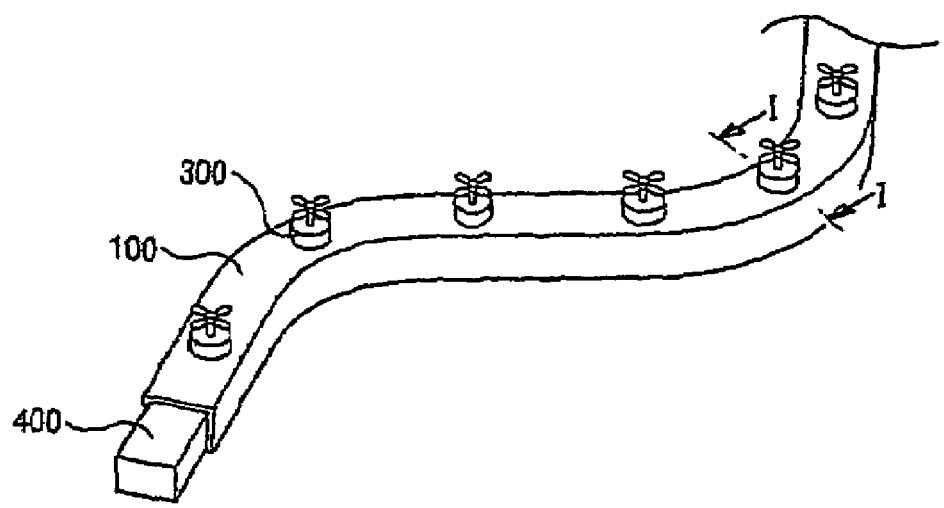
FIGS. 15A to 15C are schematic views illustrating a rotating apparatus using a magnet, in which a containing member and a separating member are made of a flexible material so that the containing member and the separating member can be arranged in a designated shape by a user.
Figure 15B:
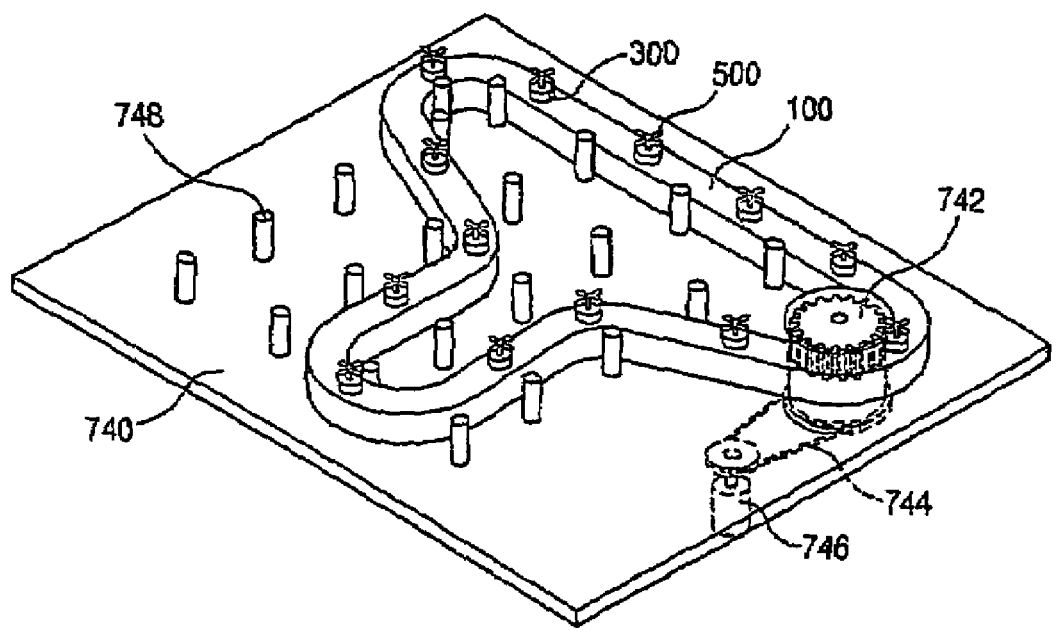

As shown in FIG. 15A, it is possible to manufacture a separating member having a tubular shape and insert a containing member into a hollow of the separating member. A plurality of the movable magnets 200 are positioned in the containing member 400, and a plurality of passive magnets 300 are positioned on one outer surface of the separating member 100. As shown in FIG. 15B, it is possible to arrange the separating member 100 including the containing member 400 in a certain shape using pins 748 formed on a base substrate 740 by designated intervals. In this case, the containing member 400 and the separating member 100, which are made of a flexible material, can be arranged in various shapes by user's desire.

The containing member 400 is coupled with the driving roller 742 connected to the motor 746 by a belt 744. In this case, teeth (not shown) are formed on one side surface of the containing member 400 coupled with the driving roller 742. Preferably, a portion of the separating member 100 having a tubular shape, contacting the driving roller 742, is opened so that teeth formed on the one surface of the containing member 400 are engaged with teeth of the driving roller 742.

Figure 15C:
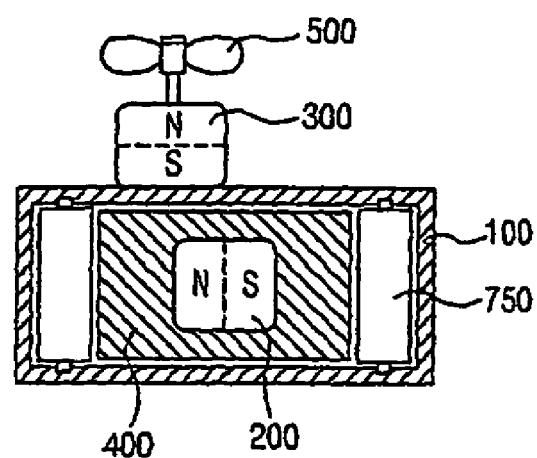

As shown in FIG. 15C, it is preferable that a roller 750 is positioned in a hollow of the separating member 100 so that the containing member 400 more smoothly moves in the tubular-shaped separating member 100. For reference, FIG. 15C is a cross-sectional view taken along the line I-I of FIG. 15A, in case that the roller 750 is positioned in the hollow of the separating member 100.

Figure 16:
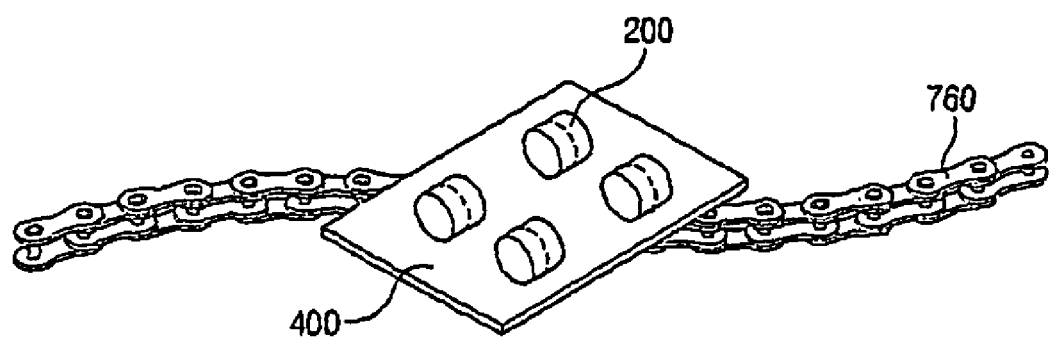
FIG. 16 is a perspective view illustrating the connection of a containing member, a movable magnet and a chain, in case that a chain conveyor device is used as driving means.

FIGS. 12 to 15 illustrate the arrangement in which a plurality of the movable magnets are buried under the containing member. Here, in case that the containing member is made of a magnetic material, the rotation of the passive magnets is disturbed by the magnetic material interposed between the passive magnets and the movable magnets. Accordingly, it is preferable that the containing member, under which the movable magnets are buried, is made of a nonmagnetic material. However, in case that a chain conveyor device made of iron is used as shown in FIG. 16, when the movable magnets 200 are positioned on the upper surface of the containing member 400, it is possible to use the containing member 400 made of a magnetic material such as iron. That is, after a base plate serving as the containing member 400 is installed on the chain 760 and the movable magnets 200 are positioned on the upper surface of the containing member 400, the separating member (not shown) is positioned adjacent to the upper surfaces of the movable magnets 200.

Although the driving means of a conveyor manner drives any one of the separating member and the containing member, the driving means may drive both the separating member and the containing member simultaneously. For example, the separating member and the containing member are respectively made of conveyor belts driven in opposite directions. Otherwise, in case the separating member and the containing member are made of conveyor belts driven in the same direction, the separating member and the containing member are shifted relatively to each other by differently controlling the shift speeds thereof.

Figure 17A:
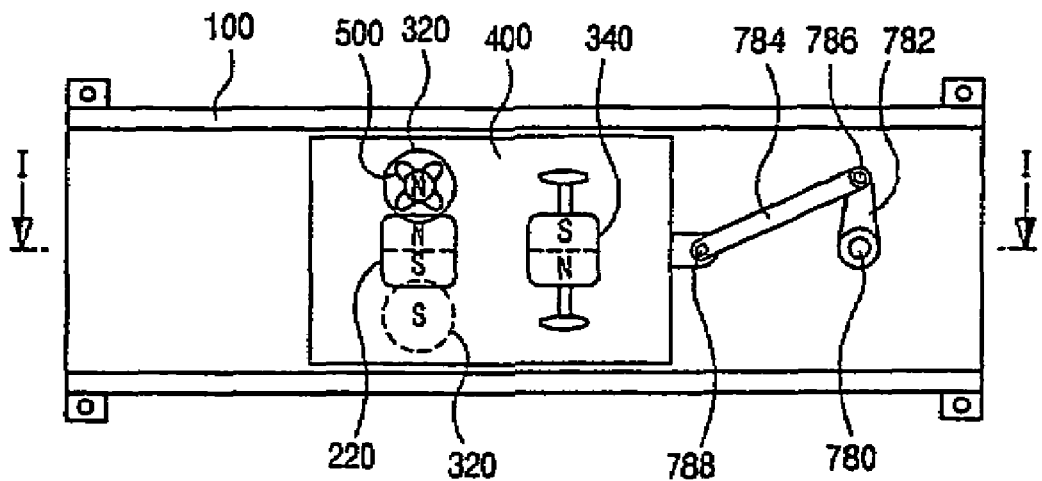
FIG. 17A is a schematic view illustrating a rotating apparatus using a magnet, in which a crank mechanism is used as driving means.
Figure 17B:
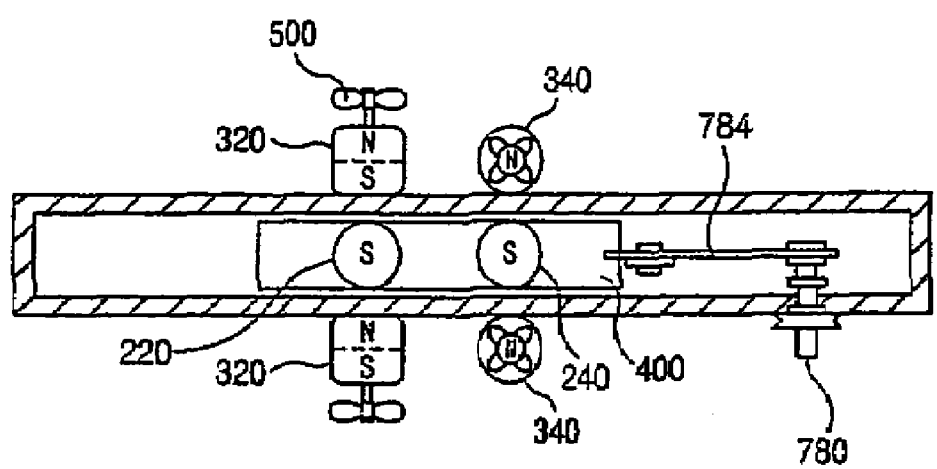
FIG. 17B is a cross-sectional view of the rotating apparatus of FIG. 17A taken along the line I-I.

FIGS. 17A and 17B illustrate a rotating apparatus using a magnet, in which a crank mechanism is used as driving means. As shown in FIGS. 17a and 17b, the containing member 400 provided with a plurality of the movable magnets 220 and 240 therein is positioned in the separating member 100. A driving shaft of a motor (not shown) is used as a crank shaft 780, and one end of a connection rod 784 is connected to a crank arm 782 by a pin 786. The other end of the connection rod 784 is connected to one end of the containing member 400 by a pin 788. Thereby, the containing member 400 reciprocates according to the rotation of the motor.

As shown in FIG. 17B, the passive magnets 320 and 340 are coupled with the movable magnets 220 and 240 by magnetic force through the separating member 100. Here, the passive magnet 320 is arranged such that the passive magnet 320 is horizontally rotated, and the passive magnet 340 is arranged such that the passive magnet 340 is rollingly rotated. In the above rotating apparatus using a magnet, as the containing member 400 reciprocates, the passive magnets 320 and 340 reciprocate along the movable magnets and simultaneously rotate.

As shown in FIGS. 17A and 17B, the containing member or the separating member can be shifted relatively to each other by a motion change mechanism for changing a rotary motion of the driving motor to a reciprocating motion. Although FIGS. 17A and 17B illustrate the reciprocating motion of the containing member, it is possible to reciprocate the separating member. Further, instead of the crank mechanism, a cam mechanism or other mechanism similar to the crank mechanism may be used as the motion change mechanism.

Figure 18A:
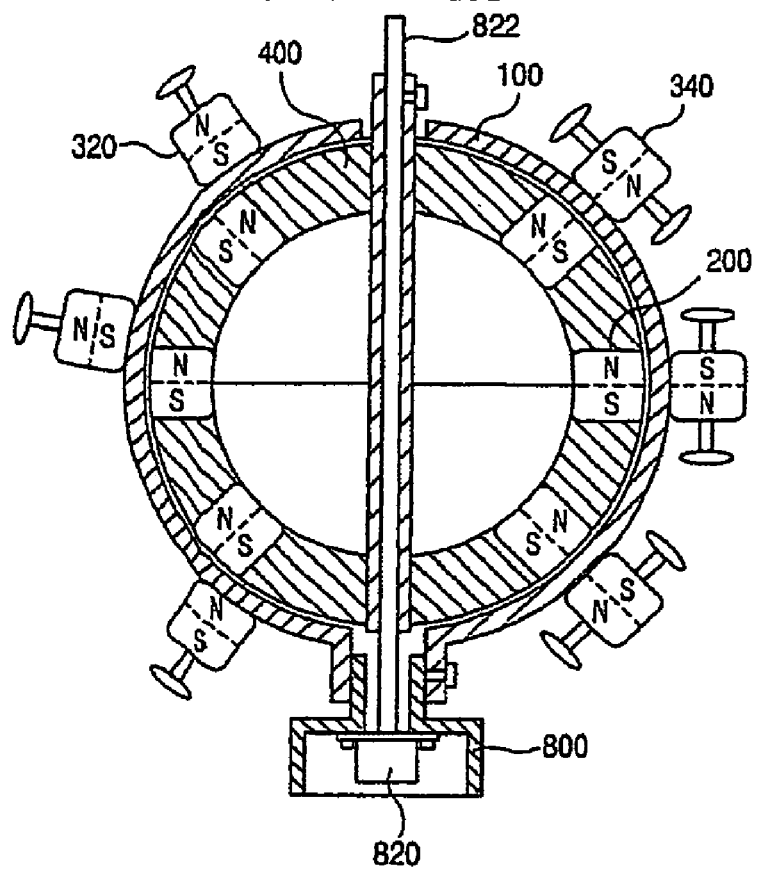
FIG. 18A is a cross-sectional view of a rotating apparatus using a magnet, in which a shell plate having a spherical shape is used as a separating member.
Figure 18B:
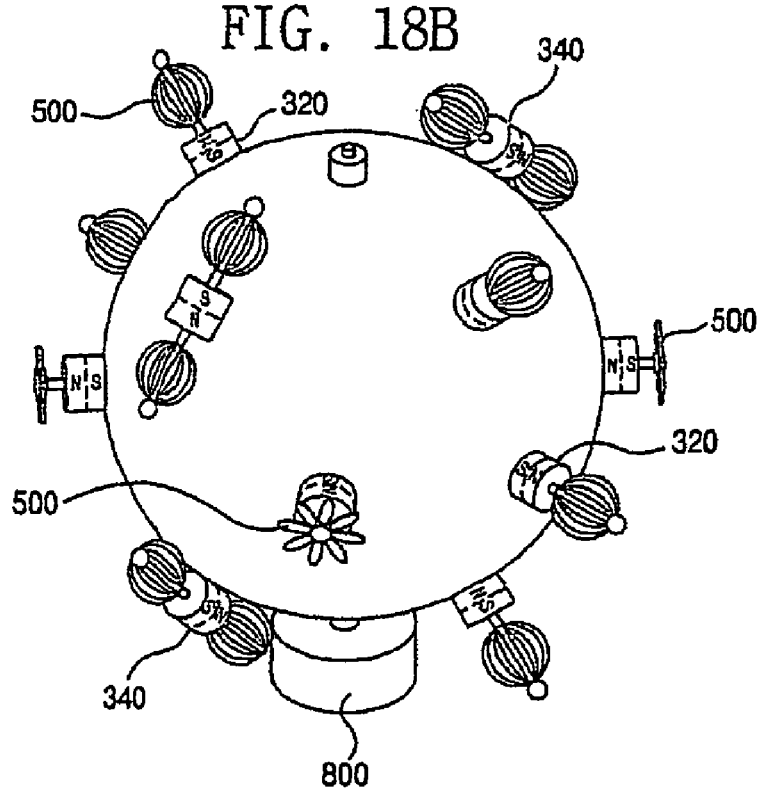
FIG. 18B is a perspective view of a rotating apparatus using a magnet, in which a passive magnet provided with a decoration is arranged on an outer surface of a separating member.

FIGS. 18A and 18B illustrate a rotating apparatus using a magnet, in which a shell plate having a hollow spherical shape is used as a separating member. As shown in FIG. 18A, the separating member 100 is the hollowed shell plate, and the spherical containing member 400 is positioned in the hollow of the separating member 100. A plurality of the movable magnets 200 are positioned on the outer circumference of the containing member 400 such that the movable magnets 200 contact the inner circumference of the separating member 100. A plurality of the passive magnets 320 and 340 positioned on the outer circumference of the separating member 100 are coupled with the corresponding movable magnets by magnetic force.

In the rotating apparatus using a magnet shown in FIG. 18A, a driving motor 820 is installed under a supporter 800. The containing member 400 is fixed to a driving shaft 822 connected to an output shaft of the driving motor 820. When the driving motor 820 is driven, the containing member 400 is rotated along the inner surface of the separating member 100. Then, the passive magnets 320 and 340 positioned on the outer surface of the separating member 100 are revolved on their own axes and rotated along the movable magnets 200.

Where the passive magnets 320 are arranged such that the passive magnets 320 are horizontally rotated, and the passive magnets 340 are arranged such that the passive magnets 340 are rollingly rotated. FIG. 18b illustrates a rotating decoration using the rotating apparatus using a magnet shown in FIG. 18a. As shown in FIG. 18a, decorations 500 having various shapes are respectively attached to the passive magnets 320 and 340, or form a pattern desired by a user, thus being applied to a toy, an interior decoration, an advertising sign, etc.

Figure 19:
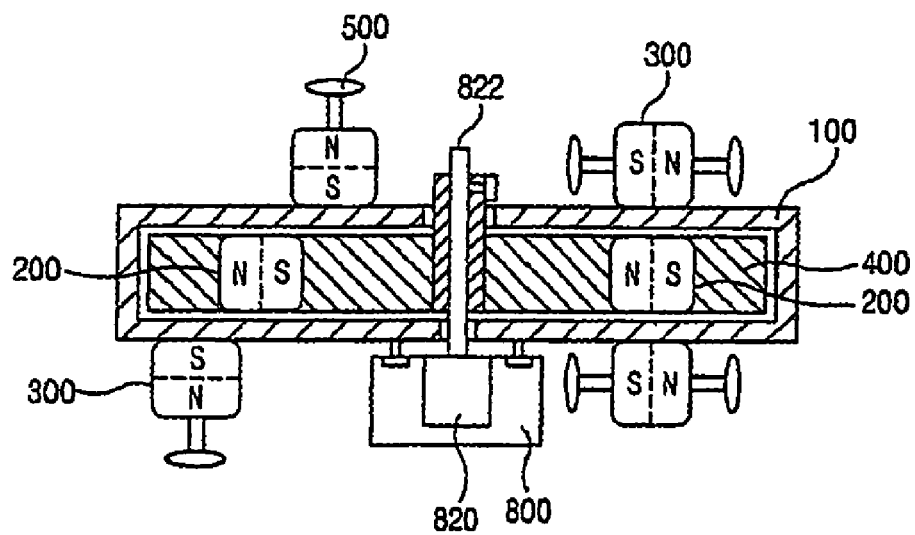
FIG. 19 is a cross-sectional view of a rotating apparatus using a magnet, in which a shell plate having a circular plate shape is used as a separating member.

FIG. 19 illustrates a rotating apparatus using a magnet, in which a shell plate having a circular plate shape is used as a separating member. The constitution of the rotating apparatus shown in FIG. 19 is similar to that of the rotating apparatus shown in FIG. 18a. However, the separating member 100 is the circular shell plate, and the containing member 400 is positioned in a hollow formed in the separating member 100. The containing member 400 is fixed to the driving shaft 822 of the motor 820 installed on the supporter 800, and is rotated along the inner surface of the separating member 100, when the motor 829 is driven. In the above rotating apparatus, the passive magnets 300 positioned on the outer surface of the separating member 100 are revolved on their own axes and rotated along the movable magnets 200 positioned in the containing member 400.

Figure 20:
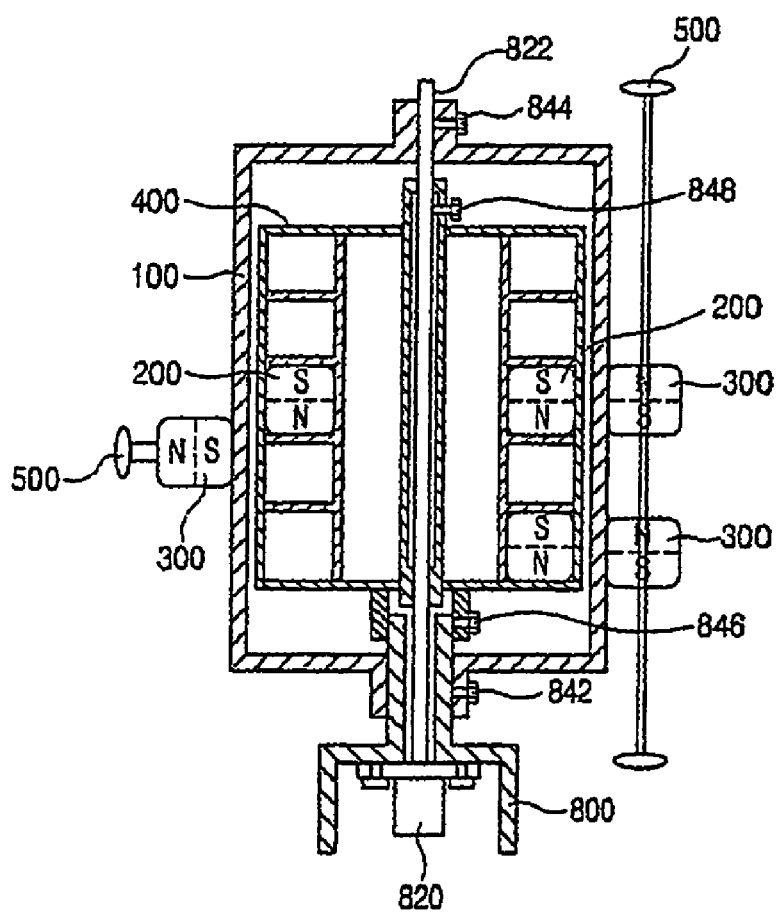
FIG. 20 is a cross-sectional view of a rotating apparatus using a magnet, in which a shell plate having a cylindrical shape is used as a separating member.

FIG. 20 illustrates a rotating apparatus using a magnet, in which a shell plate having a cylindrical shape is used as a separating member. The constitution of the rotating apparatus shown in FIG. 20 is similar to those of the rotating apparatuses shown in FIGS. 18A and 19. However, in the rotating apparatus of FIG. 20, the separating member 100, which is the cylindrical shell plate, is connected to the driving shaft 822, or the containing member 400 positioned in the separating member 100 is connected to the driving shaft 822. Where the separating member 100 is required to be rotated, a lower fixing screw 842 fixed to the supporter 800 is loosened and an upper fixing screw 844 is tightened up and fixed to the driving shaft 822. Here, the containing member 400 is fixed to the supporter 800 by loosening an upper fixing screw 848 fixed to the driving shaft 822 and fixing a lower fixing screw 846 to the supporter 800. On the other hand, in case that the containing member 400 is required to be rotated, a lower fixing screw 846 fixed to the supporter 800 is loosened and an upper fixing screw 848 is tightened up and fixed to the driving shaft 822. Here, the separating member 100 is fixed to the supporter 800 by loosening the upper fixing screw 844 fixed to the driving shaft 822 and fixing the lower fixing screw 842 to the supporter 800. In the above-described manner, the separating member 100 or the containing member 400 is selectively connected to the driving shaft 822 and rotated.

In case that the separating member 100 is connected to the driving shaft 822 and the containing member 400 is fixed to the supporter 800, the passive magnets 300 arranged on the outer surface of the separating member 100 are revolved on their own axes. On the other hand, in case that the containing member 400 is connected to the driving shaft 822 and the separating member 100 is fixed to the supporter, the passive magnets 300 on the outer surface of the separating member 100 are revolved on their own axes and rotated along the movable magnets 200.

Figure 21A:
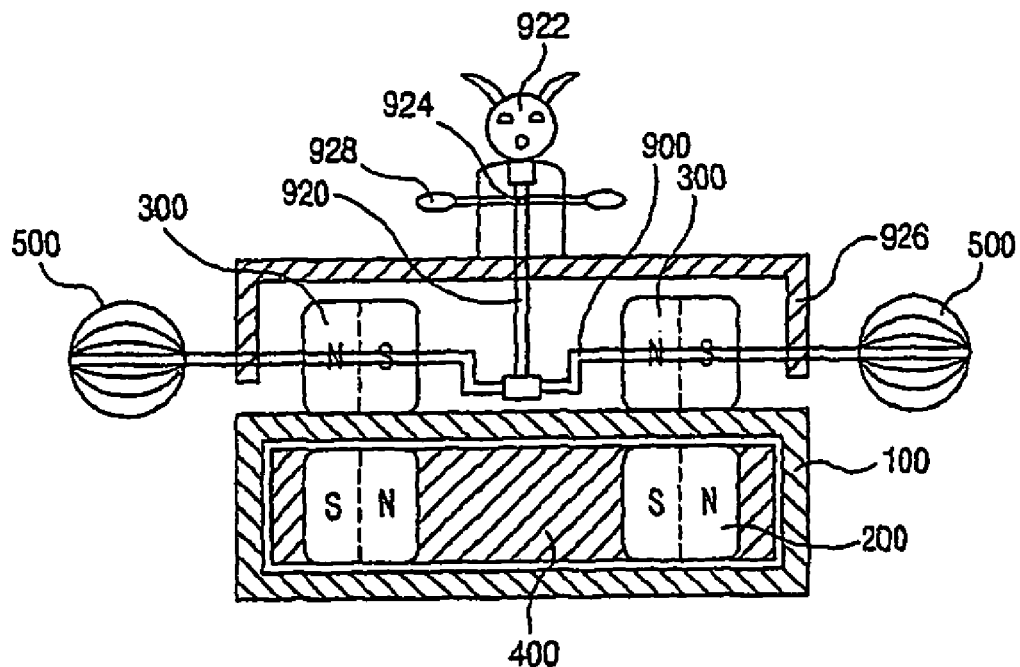
FIG. 21A is a cross-sectional view of a toy using a rotating apparatus using a magnet of the present invention.
Figure 21B:
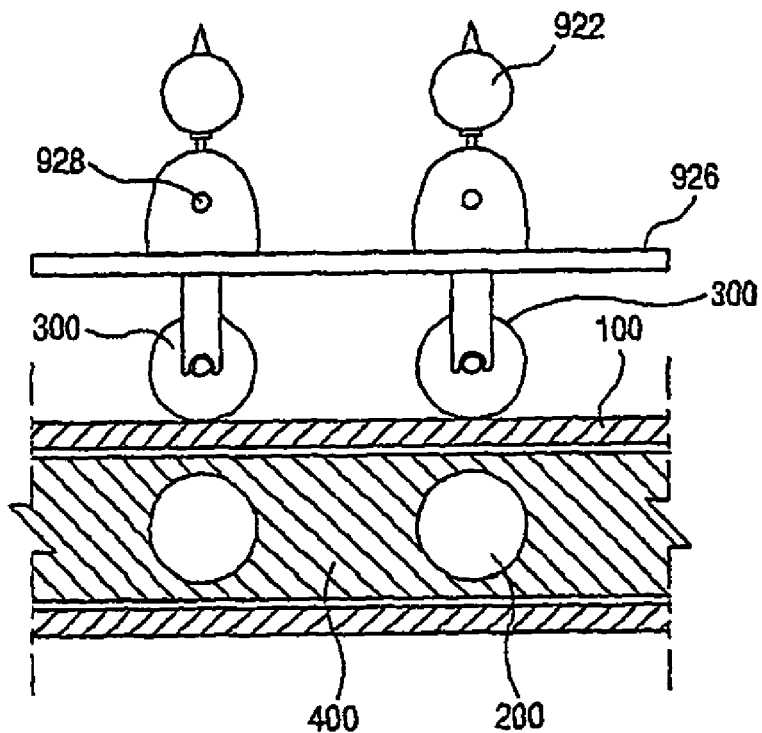
FIG. 21B is another cross-sectional view of the toy of FIG. 21A.

FIGS. 21A and 21B illustrates a toy car shifted on a separating member of a rotating apparatus using a magnet of the present invention. In the same manner as the arrangement shown in FIG. 2, the movable magnets 200 and the passive magnets 300 are arranged such that the passive magnets 300 are rollingly-rotated on the outer surface of the separating member 100. Here, two passive magnets 300 serve as a pair of wheels of the car. Rotary centers of the two passive magnets 300 are interconnected by a shaft 900. The shaft 900 is a crack shaft connected to a crack arm 920. A doll 922 is positioned on the upper surface of a car body 926, and an arm 928 of the doll 922 is connected to the crank arm 920 by a pin 924.

In the toy car shown in FIGS. 21A and 21B, when the containing member 400 is shifted relatively to the separating member 100, the passive magnets 300 are shifted on the separating member 100 along the movable magnets 200 positioned on the containing member 400, and is rolling rotated. Accordingly, the above toy car rolls on the separating member 100 by the rolling rotation of the passive magnets 300. The arm 928 and a head of the doll 922 vertically moves by means of crank mechanisms 900 and 920 connected to the passive magnets 300. A more interesting toy may be manufactured by using the conveyor device shown in FIGS. 15A and 15B as the separating member 100 and the containing member 400. Although the crank shaft of FIGS. 21a and 21b is attached to the passive magnets 300, which are rollingly-rotated, it is possible to attach the crank shaft to passive magnets 300, which are horizontally rotated so as to manufacture a mobile toy.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The embodiments of the invention in which an exclusive property or privilege is claimed are defined as follows:

1. A rotating apparatus using a magnet, comprising:
a nonmagnetic separating member;
at least one movable magnet spaced apart from the separating member along a first surface of the separating member, N-pole and S-pole of the movable magnet being arranged along the first surface of the separating member; and
at least one passive magnet placed on the a second surface of the separating member, the second surface being in opposed relation to the first surface, the passive magnet being coupled to the movable magnet by magnetic force, and configured to rotate on the second surface of the separating member while drawn along the second surface by means of attraction to the movable magnet when the movable magnet and the separating member are shifted relatively to each other.

2. The rotating apparatus according to claim 1, wherein; the movable magnet and the passive magnet are placed in such a manner that a portion of a surface of the passive magnet where attractive force from the movable magnet working on the passive magnet is maximized, is spaced apart from a center of rotation of the passive magnet.

3. The rotating apparatus according to claim 1, wherein: the movable magnet includes first movable magnet face and second movable magnet face on which a N-pole and a S-pole are presented respectively.

4. The rotating apparatus according to claim 1, wherein: the movable magnet includes one face on which N-pole and S-pole are presented.

5. The rotating apparatus according to claim 1, wherein: the passive magnet includes two faces on which each of a N-pole and S-pole are presented respectively.

6. The rotating apparatus according to claim 5, wherein: either one of a N-pole face and a S-pole face of the passive magnet is situated on the second surface of the separating member.

7. The rotating apparatus according to claim 5, wherein: the passive magnet has a cylindrical form of which a circumferential surface is situated to come into contact with the second surface of the separating member.

8. A rotating apparatus using a magnet, comprising:
a nonmagnetic separating member;
at least two movable magnets, including a first and a second movable magnet, spaced apart from the separating member along a first surface of the separating member, any one of N-pole and S-pole of each of the movable magnets being arranged along the first surface of the separating member; and
at least one passive magnet placed on a second surface of the separating member, the second surface being in opposed relation to the first surface, the passive magnet being coupled to the movable magnets by magnetic force, and configured to rotate on the second surface of the separating member when the movable magnets and the separating member are shifted relatively to each other.

9. The rotating apparatus according to claim 8, wherein: the movable magnets and the passive magnet are placed in such a manner that a portion of the passive magnet, where attractive force of the movable magnets exerted on the passive magnet is the maximized, is eccentric from a center of rotation of the passive magnet.

10. The rotating apparatus according to claim 8, wherein each of the movable magnets includes two faces on which each of a N-pole and a S-pole are formed respectively.

11. The rotating apparatus according to claim 10, wherein: the movable magnets are arranged to be adjacent to each other in such a manner that each N-pole and each S-pole are alternatively arranged.

12. The rotating apparatus according to claim 11, wherein: the passive magnet includes two faces on which each of a N-pole and a S-pole are formed respectively, of which any one of a N-pole face and a S-pole face is situated on the second surface of the separating member.

13. The rotating apparatus according to claim 12, wherein: the movable magnets wherein the second movable magnet is smaller than the first movable magnet, and the passive magnet is placed on the side of the second movable magnet.

14. The rotating apparatus according to claim 11, wherein: the passive magnet has a cylindrical form including two faces on which N-pole and S-pole are formed respectively, and a portion of circumferential surface is situated on the second surface of the separating member.

15. The rotating apparatus according to claim 10, wherein: the apparatus includes a couple of movable magnets coupled with the passive magnet, the couple of movable magnets being arranged in such a manner that same magnetic poles are adjacent to the one surface of the separating member while having a space between the couple of movable magnets, the passive magnet including two faces on which N-pole and S-pole are formed respectively, any one of the N-pole face and the S-pole face of the passive magnet being situated on the second surface of the separating member above a space between the each of the couple of movable magnets.

16. A rotating apparatus using a magnet, comprising:
a nonmagnetic separating member;
at least one movable magnet relatively shifted from the separating member along a first surface of the separating member, any one of N-pole and S-pole of the movable magnet being arranged along the first surface of the separating member;
a nonmagnetic isolating member placed on a second surface of the separating member, the second surface being in opposed relationship to the first surface, at a position opposite to the movable magnet along the route formed by relative shift of the movable magnet and the separating member; and
at least one passive magnet placed beside the isolating member on the other surface of the separating member, the passive magnet being coupled with the movable magnet by magnetic force, and rotating on the other surface of the separating member while moving along the movable magnet when the movable magnet and the separating member are shifted relatively to each other.

17. The rotating apparatus according to claim 16, wherein: the movable magnet includes two faces on which a N-pole and a S-pole are formed respectively.

18. A rotating apparatus according to claim 16, wherein: the passive magnet has a cylindrical form including two faces on which a N-pole and a S-pole are formed respectively, any one of the N-pole face and the S-pole face of the passive magnet being situated on the second surface of the separating member.

19. The rotating apparatus according to any one of claim 1 through 18, wherein:
the rotating apparatus further includes a containing member in which the movable magnet is arranged.

20. The rotating apparatus according to claim 19, wherein:
the apparatus further includes a driving means for driving at least one of the separating member and the containing member so as to relatively shift the movable magnet from the separating member.

21. The rotating apparatus according to claim 20, wherein:
the driving means is a conveyor device.

22. The rotating apparatus according to claim 21, wherein:
the separating member includes a conveyor belt, the containing member being situated on one of the first or second surfaces of the separating member, and the driving means includes a belt conveyor for driving the separating member.

23. The rotating apparatus according to claim 21, wherein:
the containing member includes a belt conveyor roller.

24. The rotating apparatus according to claim 21, wherein:
the containing member includes a conveyor belt, the separating member is placed so as to cover the containing member, and the driving means includes a belt conveyor for driving the containing member.

25. The rotating apparatus according to claim 24, wherein:
the separating member includes a tubular member configured to contain the containing member is able to be inserted.

26. The rotating apparatus according to claim 25, wherein:
the separating member includes a roller that is arranged to contact with the containing member inside the separating member.

27. The rotating apparatus according to claim 21, wherein:
the driving means includes a chain conveyor device including a chain,
the containing member includes a base plate having a lower side, the lower side being fixed on the chain, the movable magnet is arranged on an upper side of the base plate, and
the separating member is arranged to be adjacent to the movable magnet.

28. The rotating apparatus according to claim 20, wherein:
the driving means includes:
a driving motor, and
a motion change mechanism for changing a rotary motion of the driving motor to an alternating motion.

29. The rotating apparatus according to claim 28, wherein:
the motion change mechanism is either one of a cam mechanism and a crank mechanism.

30. A rotating apparatus according to claim 20, wherein:
the driving means includes:
a driving motor and
a driving shaft rotated by the driving motor,
the separating member is a shell plate having an inside surface and an outside surface, the inside surface defining an internal cavity,
the containing member is placed within the cavity of the separating member so as to be adjacent to the inside surface, and
at least one of the separating member and the containing member is connected to the driving shaft so as to be rotated.

31. The rotating apparatus according to claim 19, wherein:
the passive magnet has a round shape, and
a friction ring is inserted to a circumferential surface of the passive magnet.

32. The rotating apparatus according to claim 19, wherein:
a vertical friction plate is configured to rise orthogonally to the second surface of the separating member and to contact the passive magnet.

33. The rotating apparatus according to claim 19, wherein:
a friction plate is attached on at least one magnetic pole face of the passive magnet.

34. The rotating apparatus according to claim 19, wherein:
the surface of the passive magnet situate on the separating member is formed into a curved surface.

35. The rotating apparatus according to claim 19, wherein:
the apparatus further includes a bar placed on a center of rotation of the passive magnet, and
a circular friction plate formed on an end of the base, a circumferential surface of the circular friction plate being formed into a friction surface contacted to the other surface of the separating member.

36. The rotating apparatus according to claim 19, wherein the apparatus includes:
an inclined protrusion sloping on at least one side, the inclined protrusion being formed on the other surface of the separating member so as to change the arrangement of the passive magnet.

37. A rotating apparatus according to claim 19, wherein:
the passive magnet includes a rotating shaft extending perpendicularly to a rotating surface thereof.

38. A rotating decoration, comprising:
the rotating apparatus using a magnet according to claim 20; and
a rotating body rotated by the passive magnet of the rotating apparatus.

39. The rotating decoration according to claim 38, wherein the decoration further includes:
a crank shaft extending perpendicularly to a rotating surface of passive magnet.

40. A rotating apparatus using a magnet, comprising:
a nonmagnetic separating member;
a containing member placed along one surface of the separating member so as to be relatively shifted from the separating member;
at least one movable magnet arranged in the containing member;
a magnetic rotating member placed on the other surface of the separating member, the magnetic rotating member being coupled with the movable magnet by magnetic force, and rotating on the other surface of the separating member while moving along the movable magnet when the containing member and separating member are shifted relatively to each other; and
a driving means for driving at least one of the separating member and containing member so as to shift the movable magnet from the separating member.

41. The rotating apparatus according to claim 40, wherein:
the magnetic rotating member has any one of cylindrical form and spherical form.

42. A rotating apparatus using a magnet, comprising:
a nonmagnetic separating member;
a containing member placed along one surface of the separating member so as to be relatively shifted from the separating member;
at least one magnetic movable member arranged in the containing member;

a passive magnet placed on the other surface of the separating member, the passive magnet being coupled with the magnetic movable member by magnetic force, and rotating on the other surface of the separating member while moving along the magnetic movable member when the containing member and the separating member are shifted relatively to each other; and a driving means for driving at least one of the separating member and the containing member so as to shift the magnetic movable member from the separating member.

43. A rotating apparatus using a magnet, comprising:

a nonmagnetic separating member;

a containing member placed along one surface of the separating member so as to be relatively shifted from the separating member;

a plurality of movable magnets arranged in the containing member so that N-pole and S-pole of each of the movable magnets are arranged along the one surface of the separating member;

a plurality of first round passive magnets placed on the other surface of the separating member so as to be adjoined to each other, any one of N-pole face and S-pole face being situated on the other surface of the separating member, the first round passive magnets being coupled with the movable magnets by magnetic force, and rotating on the other surface of the separating member while moving along the movable magnets when the movable magnets and the separating member are shifted relatively to each other;

a plurality of second round passive magnets placed on an upper side of a couple of the first round passive magnets adjoined to each other among the plurality of first round passive magnets, circumferential surfaces of each of the second round passive magnets being adjoined with the couple of the first round passive magnets; and a driving means for driving at least one of the separating member and the containing member so as to shift the movable magnets from the separating member.

* * * * *